US006291572B1

(12) United States Patent
Brown et al.

(10) Patent No.: US 6,291,572 B1
(45) Date of Patent: *Sep. 18, 2001

(54) ELASTOMER COMPOSITIONS AND METHODS

(75) Inventors: Trevor Alan Brown, Groton; Meng-Jiao Wang, Lexington; Ralph E. Dickinson, Dracut, all of MA (US)

(73) Assignee: Cabot Corporation, Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/851,170

(22) Filed: May 2, 1997

Related U.S. Application Data

(63) Continuation-in-part of application No. 08/784,802, filed on Jan. 16, 1997, now Pat. No. 5,916,956, which is a continuation-in-part of application No. 08/642,681, filed on May 3, 1996.

(51) Int. Cl.[7] ..................................................... C08K 3/00

(52) U.S. Cl. ........................... 524/492; 523/351; 524/493; 524/495; 524/496

(58) Field of Search ............................ 523/351; 524/492, 524/493, 495, 496

(56) References Cited

U.S. PATENT DOCUMENTS

| | | | |
|---|---|---|---|
| 3,048,559 | 8/1962 | Heller et al. . | |
| 3,660,132 | * 5/1972 | Illigen ................................. | 105/307 |
| 3,768,537 | * 10/1973 | Hess .................................... | 152/330 |
| 4,029,633 | 6/1977 | Hagopian et al. . | |
| 4,705,819 | * 11/1987 | Scriver ................................ | 523/351 |
| 4,837,266 | * 6/1989 | Sattelmeyer ........................ | 524/511 |
| 4,876,297 | * 10/1989 | Peter ................................... | 523/351 |
| 5,159,009 | 10/1992 | Wolff et al. . | |
| 5,227,425 | 7/1993 | Rauline . | |
| 5,328,949 | 7/1994 | Sandstrom et al. . | |
| 5,580,919 | 12/1996 | Agostini et al. . | |
| 5,674,932 | 10/1997 | Agostini et al. . | |
| 5,830,930 | 11/1998 | Mahmud et al. ................... | 523/215 |
| 5,877,238 | 3/1999 | Mahmud et al. ................... | 523/215 |
| 5,904,762 | 5/1999 | Mahmud et al. ................... | 106/475 |
| 5,916,934 | 6/1999 | Mahmud et al. ................... | 523/215 |
| 5,919,841 | 7/1999 | Mahmud et al. ................... | 523/351 |
| 5,948,835 | 9/1999 | Mahmud et al. ................... | 523/215 |
| 5,977,213 | 11/1999 | Mahmud et al. ................... | 523/351 |
| 6,008,272 | 12/1999 | Mahmud et al. ................... | 523/351 |
| 6,017,980 | 1/2000 | Wang et al. ........................ | 523/215 |
| 6,028,137 | 2/2000 | Mahmud et al. ................... | 524/596 |
| 6,057,387 | 5/2000 | Mahmud et al. ................... | 523/215 |

FOREIGN PATENT DOCUMENTS

| | | |
|---|---|---|
| 3600701A | 7/1997 | (DE) . |
| 0468140A | 1/1992 | (EP) . |
| 620250A | 3/1994 | (EP) . |
| 0731135A | 9/1996 | (EP) . |
| 05112674 A | 7/1993 | (JP) . |
| WO 96/37546 | 11/1996 | (WO) . |
| WO 96/37547 | 11/1996 | (WO) . |
| WO96 37547 | 11/1996 | (WO) . |

OTHER PUBLICATIONS

Natural Rubber Carbon Black Masterbatches from Field Latex by Shukri Bin Abdul Wahab, K.P. NG. Kamarul Baharain Bin Basir and W.P. Chang, Rubber Research Institute of Malaysia, Kuala Lumpur, Malaysia, pp. 29–41, *Proceedings of NR Technology Seminar*, Dec. 1978.

Research Disclosure, "Functionalization of Elastomers by Reactive Mixing", No. 362, pp. 308–312, Jun. 1, 1994.

Research Disclosure, "Improved Process for Exxpro™ (BRXP50) Tire Bladder Manufacturing", No. 375, p. 504, Jul. 1, 1995.

Silica–Filled, Low Rolling Resistance, Tire Compounding, Presented by Louis Panzer, *Carbon Black World 97*, Mar. 19–21, 1997, Le Mansion Hotel, San Antonio, Texas.

International Search Report PCT/US97/07462, Date of Mailing, Sep. 5, 1997.

(List continued on next page.)

Primary Examiner—Edward J. Cain

(57) ABSTRACT

Novel methods of making elastomer compositions include the use of certain modifying agents and mechanical working prior to incorporation of a vulcanization system in a first or other early stage of a multi-stage process particulate filler, such as carbon black, and sulfur cross-linking agent are substantially dispersed into sulfur crosslinkable hydrocarbon elastomer. The particulate filler and sulfur crosslinking agent can be pre-mixed together as a pre-blend prior to being added to the elastomer. A substantially unvulcanized, processable elastomer is produced by the multi-stage process, involving further mechanical working of the initial masterbatch. A curative additive comprising accelerator, and optionally additional sulfur crosslinking agent, can be added and dispersed in the elastomer to produce a vulcanizable composition. In accordance with another aspect, extender oil is added to the elastomer subsequent to addition and substantial dispersion of the filler and sulfur crosslinking agent into the elastomer in the aforesaid early stage of the multi-stage process. Significant improvement in performance characteristics is achieved, especially by preferred embodiments, including good abrasion resistance and low hysteresis measured, for example, as tan delta-max at 70° C. The present invention further relates to novel unvulcanized, processable elastomer compositions comprising certain treated carbon black particulate filler and certain pre-vulcanization modifier in an amount effective to substantially increase bound rubber content in a substantially unvulcanized processable elastomer product of a non-productive thermo-mechanical working of the elastomer composition.

43 Claims, 4 Drawing Sheets

OTHER PUBLICATIONS

U.S. Ser. No. 09/392,803, entitled "Elastomeric Compounds Incorporating Silicon–Coated Carbon Blacks," by Mahmud, et al., filed Sept. 9, 1999 which is a Continuation of U.S. Application No. 08/750,017, filed Aug. 14, 1997 (U.S. Patent 6,028,137 issued Feb. 22, 2000), which is the U.S. National Phase of PCT/US96/07310 filed May 21, 1996, which is a Continuation in Part of Prior Application No. 08/446,141, filed May 22, 1995 (U.S. Patent 5,830,950 issued Nov. 3, 1998), and a Continuation in Part of U.S. Application No. 08/446,142 filed May 22, 1995 (U.S. Patent 5,877,238 Mar. 2, 1999) and a Continuation in Part of U.S. No. 08/528,895 filed Sep. 15, 1995 (abandoned).

Pending U.S. Application No. 09/453,419, filed Dec 2, 1999, entitled "A Method of Multi–Phase Aggregate Using a Multi–Stge Process".

Pending U.S. Application No. 09/37,5044, filed Aug. 16,1999, entitled "Method of Making a Multi–Phase Aggregate Using a Multi–Stage Process".

U.S. Serial No. 08/937,154, entitled "Silica Coated Carbon Blacks", by Mahmud, et al., filed Sep. 25, 1997, which claims the benefit of U.S. Provisional Application No. 60/026,689 filed Sep. 25, 1996.

* cited by examiner

ELASTOMER COMPOSITIONS AND METHODS

This is a continuation-in-part of application Ser. No. 08/784,802, filed Jan. 16, 1997, now U.S. Pat. No. 5,916,956 continuation-in-part of U.S. Ser. No. 08/642,681, filed on May 3, 1996.

FIELD OF THE INVENTION

The present invention relates to novel methods of making elastomer compositions, including use of certain modifying agents and mechanical working prior to incorporation of a vulcanization system. The present invention further relates to novel elastomeric compositions made by such methods.

BACKGROUND

Elastomer compositions suitable for such application as motor vehicle tire tread, for example, typically employ carbon black fillers as reinforcing agents to provide high abrasion resistance and good hysteresis properties, including low hysteresis at elevated temperatures (e.g., 70° C.). Other applications employing elastomers exhibiting good abrasion and/or hysteresis properties include other tire components, such as undertread, wedge compounds, sidewall, carcass, apex, bead filler and wire skim, as well as engine mounts and base compounds used in industrial drive and automotive belts. In this regard, it is well-known, of course, that elastomers are not completely elastic, such that upon recovery from deformation only a part of the energy used to deform the elastomer is returned. The lost energy, hysteresis, usually manifests itself in the form of heat. This energy loss can be a significant disadvantage in applications such as tire tread, since it results in undesirable rolling resistance. Thus, the hysteresis of an elastomer composition under cyclic deformation, such as the cyclic deformationi experienced by a tire tread in normal usage, is the difference between the energy applied to deform the elastomer composition and the energy released as the elastomer composition recovers to its initial undeformed state.

Hysteresis is known to be well-characterized by a loss tangent, tan $\delta$, the ratio of the loss modulus to the storage modulus, that is, viscous modulus to elastic modulus. Also characterized as the ratio of energy lost to energy returned, the loss factor tan $\delta$ is widely used to indicate tire performance properties. Tan $\delta$ values of an elastomer composition used in tire tread, measured at low temperatures (for example, −30° C. to 0° C.) are used as an indication of wet traction capability, with higher values being desirable. For rolling resistance, typically, measurement of tan $\delta$ may be based on a temperature in the range of 40° C. to 70° C., with lower values being desirable. However, the amplitude of deformation also has a significant effect on performance, so it is also known to test hysteresis over a strain sweep (corresponding to a range from low to high deformation amplitude) at one or more fixed temperatures. The highest value measured for a given temperature, tan $\delta_{max}$, is an indicator of rolling resistance, with lower values of tan $\delta_{max}$ being desirable as corresponding to lower rolling resistance. Thus, tires made with a tire tread compound having lower hysteresis measured at higher temperatures, such as 40° C. or higher, will have correspondingly lower rolling resistance, which in turn can result in reduced fuel consumption by a vehicle equipped with such tires. Desirably, however, such tire tread compound should also have high hysteresis al: low temperature for good wet traction.

Particulate filler materials in addition to carbon black also are known for use in elastomer compositions, including various grades of silica. Silica alone as a reinforcing agent for elastomer typically yields compositions having poor performance characteristics for tire applications, compared to the results obtained with carbon black alone as a reinforcing agent. It has been theorized that strong filler-filler interaction and poor filler-elastomer interaction may account, in part, for such performance properties of silica alone. The silica-elastomer interaction can be improved by chemically bonding the two with a silane coupling agent, such as bis(3-triethoxysilylpropyl) tetra-sulfane, commercially available as Si-69 from Degussa AG (Germany). Coupling agents such as product Si-69 are generally believed to create a chemical linkage between the elastomer and the silica, thereby coupling the silica to the elastomer. When the silica is chemically coupled to the elastomer, certain performance characteristics of the resulting elastomer composition are enhanced. When incorporated into vehicle tires, certain such elastomer compositions have been found to provide, for example, improved hysteresis balance. Unfortunately, silica fillers typically are more expensive than comparable carbon black fillers, resulting often in an undesirable cost penalty for their use in elastomer compositions. In addition, silane coupling agents such as Si-69 are quite costly, further e xacerbating the cost penalty.

Coupling agents suitable for silica fillers are discussed, for example, in U.S. Pat. No. 5,328,949 to Sandstrom et al and in F. Thurn and S. Wolff, Kautsch. Gummi Kunstst. 28, 30 733 (1975). As noted there, such coupling agents are generally composed of a silane compound having a constituent component or moiety (the silane portion) capable of reacting with the silica surface and, also, a constituent component or moiety capable of reacting with the elastomer molecule, particularly a sulfur vulcanizable rubber having carbon-to-carbon double bonds or unsaturation. In this manner, the Thurn et al paper states that the coupling agent acts as a connecting bridge between the silica and the rubber and thereby enhances the rubber reinforcement performance of the silica filler. A report by the Malaysian Rubber Producers Research Association ("the MRPRA report"), *Functionalization of Elastomers by Reactive Mixing*, Research Disclosure—June 1994 (p. 308) shows a vulcanized 60:40 natural rubber: EPDNI elastomer blend comprising 50 phr N660 carbon black filler to have less bound rubber (g/g black) in the natural rubber portion and more in the EPDM portion when modified by reaction with chemicals currently employed in accelerated sulfur vulcanization of rubber compounds, including bis-4-(1,1-dimethylpropyl) phenoldisulfide ("BAPD") and dithiodimorpholine ("DTDM"). The use of dithiodicaprolactam ("DTDC") is shown to yield increased bound rubber in both. The modification by mixing at temperatures in excess of 150° C. is said to yield improved properties in the ultimate vulcanizates. An increase is reported for both SBR and EPDM-1 through modification of the elastomer with dithiodicaprolactam during mixing of the elastomer with 50 phr N330 carbon black. Other additives have been suggested for use together with curatives or a vulcanization system, including 1, 3-bis(citracon imidomethyl) benzene ("BCI-MX") sold under the trade name Perkalink 900, Akzo Nobel Chemicals, Inc., Akron, Ohio, USA. Such BCI-MX additive is said to serve as an antireversion agent during curing of a composition incorporating CBS, 6PPD, APDS, carbon black (N-375), aromatic oil (Dutrex 729 HP), zinc oxide, stearic acid and sulfur. The MRPRA report and another such report were characterized in Rubber Reviews (published by the Rubber Division, American Chemical Society) as showing modification of elastomers with sulfur donors by mixing at the elevated temperatures typical of the preparation of masterbatches in an internal mixer to achieve low levels of modification both in the absence and presence of carbon black during mixing. Such modification of the elastomers is analogized there to elastomer modification wherein a functional group (e.g., morpholine, caprolactam or alkyl phenol mono-sulfide) is bound to the rubber via a sulfur link, and this functional group is then later displaced, e.g., by 2-mercaptobenzothiazole ("MBT") etc., to create a crosslink precursor site on the rubber.

It is an object of the present invention to provide novel elastomer compositions having good abrasion and hysteresis properties. In accordance with certain preferred embodiments, it is an object to provide novel multi-stage processes for producing such elastomer compositions. Other objects and features of the invention will become apparent from the following disclosure.

SUMMARY

In accordance with one aspect, a multi-stage process for producing substantially unvulcanized elastomer composition includes one or more steps for producing a masterbatch comprising sulfur crosslinkable hydrocarbon elastomer, particulate filler, for example carbon black, etc., and a sulfur-bearing agent referred to herein as sulfur crosslinking agent. The sulfur crosslinking agent (which may be sulfur or other sulfur bearing agent) is reactive to crosslink the hydrocarbon elastomer, but is present without other ingredients required for an effective vulcanization system, such as an accelerator. The term "multi-stage process" here refers to a process which has multiple mixing or "working" stages, such as can be performed in an internal mixer or a "mill" having rollers or the like. An initial mixing stage may be carried out alternatively by suitable fluid mixing of elastomer and filler streams. Optionally, heat is added during one or more of the individual working stages, such that it may be referred to as a thermomechanical working stage, and the elastomer composition is cooled between stages. Thus, the term "working" is used here to mean mechanical mixing of the elastorner and other ingredients. The aforesaid masterbatch is produced by working of the elastomer, filler and sulfur crosslinking agent in at least one stage, referred to here as an early stage, preferably being a thermomechanical working stage carried out in an internal mixer. Preferably the "early stage" is the first mixing stage of the multi-stage process and results in substantially dispersing the filler and sulfur crosslinking agent into the elastomer. Reference here to "substantially dispersing" means dispersing into the elastomer sufficiently to mechanically incorporate the filler, etc. at least fairly uniformly into the elastomer matrix. In accordance with certain preferred embodiments, no coupling agent is added to the masterbatch during the early stage. After the initial masterbatch is formed, the aforesaid substantially unvulcanized elastomer composition is produced by further processing in one or more additional working stages of the multi-stage process. The additional stage(s) after the initial masterbatch is formed in the "early stage" may be referred to here as subsequent or post stage(s), and preferably there is either one or two such post stages. Thus, such post stage(s) comprise further mixing or working of the masterbatch produced in the early stage. As noted above, the multi-stage process most preferably has two or three working stages, of which the aforesaid early stage is a first thermomechanical working stage. Elastomer compositions in accordance with certain preferred embodiments of the present invention can optionally comprise, in addition to the elastomer, filler and sulfur crosslinking agent, various processing aids, oil extenders, antidegradants and other materials.

In certain preferred embodiments, as discussed in further detail below, the sulfur crosslinking agent and filler are added to the elastomer in a first stage of a two or three stage process, with the resulting masterbatch produced by such first stage being free or substantially free of any accelerator effective to accelerate the crosslinking functionality of the sulfur crosslinking agent. Typically, a vulcanization system is added in the last stage of the multi-stage process to produce a so-called final mix or productive mix. Such vulcanization system typically will include accelerator and, optionally, additional sulfur crosslinking agent. In accordance with certain preferred embodiments disclosed here, however, no additional crosslinker is added after the early stage of the multi-stage process. To avoid or minimize crosslinking in the final mix, most typically heat is not added during such last stage when the vulcanizatiorn system is being mixed in and dispersed throughout the elastomer composition.

In accordance with another aspect, a multi-stage process as disclosed above comprises the addition of processing oil, such as, for example, any of the aromatic oils, paraffin oils, etc., known for use with carbon black and other fillers in sulfuir crosslinkable hydrocarbon elastomer compositions, prior to the last stage of the multi-stage process. In accordance with this aspect, oil is added prior to the last stage, but subsequent to the addition and at least substantial dispersion of the sulfur crosslinking agent and filler into the elastomer. Thus, for example, in certain preferred embodiments, the sulfur crosslinking agent and filler can be admixed together to form a pre-blend which is added to the elastomer during the first stage, followed after a certain period of thermomechanical working by addition of the oil. In accordance with another aspect, a vulcanizate (vulcanized or cured rubber) is produced by vulcanizing the above-disclosed elastomer composition. In accordance with certain preferred embodiments, tire tread is formed as such a vulcanizate.

In accordance with another aspect, an elastomer composition of the invention comprises unsaturated elastomer, particulate filler, specifically, treated carbon black particulate filler (as that term is defined below), and a sulfur-bearing agent, specifically, a pre-vulcanization modifier selected from non-silane polysulfidic organo-compounds effective to substantially increase bound rubber content in a unvulcanized masterbatch composition produced by thermomechanical working including at least a non-productive thermal working stage reaching a maximum temperature sufficient to vulcanize the masterbatch if it were in the presence of a vulcanization system. The term bound rubber, as used here is intended to have a meaning consistent with the measurement procedure set forth in the Examples below. The treated carbon black fillers used in the invention include metal-treated carbon blacks, silicon-treated carbon blacks, etc., for example, aluminum-treated carbon blacks and zinc-treated carbon blacks. Such elastomer compounds obtained by compounding an elastomer with a treated carbon black are found to have desirable hysterisis balance and other advantageous properties. In such treated carbon blacks (discussed further below), one or more silicon- or metal-containing species, for example, oxides and/or carbides of silicon, aluminum, zinc, etc., are an intrinsic part of the carbon black aggregate, being distributed in at least a portion of the carbon black aggregate either primarily at the surface or throughout the aggregate. These elastomer compositions with treated carbon black optionally may further include a coupling agent, such as one of the above-mentioned, expensive silane coupling agents to impact performance properties, for example, the commercially available Si-69 material mentioned above, as well as 3-thiocyanatopropyl-triethoxy silane, vinyltriethoxysilane, methacryloxypropyltrimethoxysilane, vinyl-tris-(2-methoxysilane) or a mixture of any of them. While the chemistry of such treated carbon blacks is not yet fully understood, there is indication that the pre-vulcanization modifier comprising non-silane polysulfidic organo-compound(s) disclosed here does not have primary functionality in the nature of a silica coupling agent. Irrespective of their precise mode of operation, however, it will be recognized from the disclosure here, taken together with the detailed description below of certain preferred embodiments, that in various preferred embodiments the pre-vulcanization modifier enables improved micro-dispersion of the treated carbon black filler in vinyl-containing elastomers, especially aromatic vinyl elastomers such as SBR. In this regard, increased electrical resistivity has been observed and is believed to indicate substantially reduced filler-to-filler interaction in the resulting elastomer composition. In addition, certain preferred embodiments are found to provide excellent abrasion resistance. Most notably, preferred embodiments are found to provide lower bulk hysterisis at high temperature and high frequency conditions together also with increased micro-hysterisis at low temperature conditions. Certain of the specific pre-vulcanization modifiers disclosed below have previously been employed as components of multi-component vulcanization systems. It is significant in this regard, that the pre-vulcanization modifier is found now to be effective to substantially increase bound rubber content in a unvulcanized masterbatch composition produced by a non-productive thermomechanical working of the elastomer composition at a temperature which would be sufficient in the presence of a vulcanization system to vulcanize the masterbatch. Use of such pre-vulcanization modifier in accordance with the present disclosure is found, especially in preferred embodiments, to yield elastomer compositions having excellent improvement in hysterisis balance not afforded by such prior known different usage as a component of a vulcanization system for the elastomer. That is, the pre-vulcanization modifier yields both higher tan δ at low temperatures, such as below 0° C. for excellent wet traction performance in a tire tread application, and simultaneously lower tan δ max at higher temperatures, such as 60° C., with a low ratio of lost energy to energy returned, for example 1% to 10%, for advantageously lowered rolling resistance. These highly surprising results of improved hysterisis balance through the use of a pre-vulcanization modifier together with treated carbon black fillers will be readily understood by those skilled in the art to represent a commercially significant technological advance.

In accordance with another aspect, a substantially unvulcanized elastomer composition is provided comprising treated carbon black particulate filler dispersed in unsaturated elastomer with the reaction product of the aforesaid pre-vulcanization modifier selected from non-silane polysulfidic organo-compounds. It will be understood from the discussion immediately above that such unvulcanized elastomer composition is formed by the non-productive thermomechanical working of an elastomer composition as disclosed above.

In accordance with a further aspect, elastomer composition as disclosed above can be processed in a non-productive finishing step in which a sulfur donor vulcanization system or other suitable vulcanization system is added by thermomechanical working at a temperature below the vulcanization temperature. In accordance with yet another aspect, a vulcanized elastomer composition is provided comprising the vulcanization reaction product of the aforesaid elastomer composition admixture with vulcanization system.

In accordance with yet another aspect, a filler pre-mix is provided, comprising treated carbon black particulate filler and the above-disclosed pre-vulcanization modifier selected from non-silane polysulfidic organo-compounds. The pre-vulcanization modifier, consistent with the foregoing principles, is effective to substantially increase bound rubber content in a unvulcanized masterbatch composition resulting from a thermomechanical working of the filler pre-mix in a suitable unsaturated elastomer.

Elastomer compositions can be produced in accordance with preferred embodiments disclosed here, through the novel employment of materials and processing equipment already in use and known to those skilled in the art. Thus, implementation of the present invention can be achieved in preferred embodiments with relatively low cost. In fact, elastomer compositions achieving a certain desired level of performance characteristics can in many instances be produced at reduced cost, since such performance characteristics may be achieved even with reduced usage levels of expensive ingredients such as coupling agent Si-69 mentioned above. This surprising result of achieving improved hysteresis, especially high temperature hysteresis, and improved abrasion properties, even at reduced usage levels of expensive coupling agents widely employed to enhance such properties, presents a commercially significant technological advance. Additional aspects, features and advantages of the invention will be apparent from the following detailed discussion of certain preferred embodiments.

DETAILED DESCRIPTION OF CERTAIN PREFERRED EMBODIMENTS

Novel Multi-Stage Proces

Figure 1:
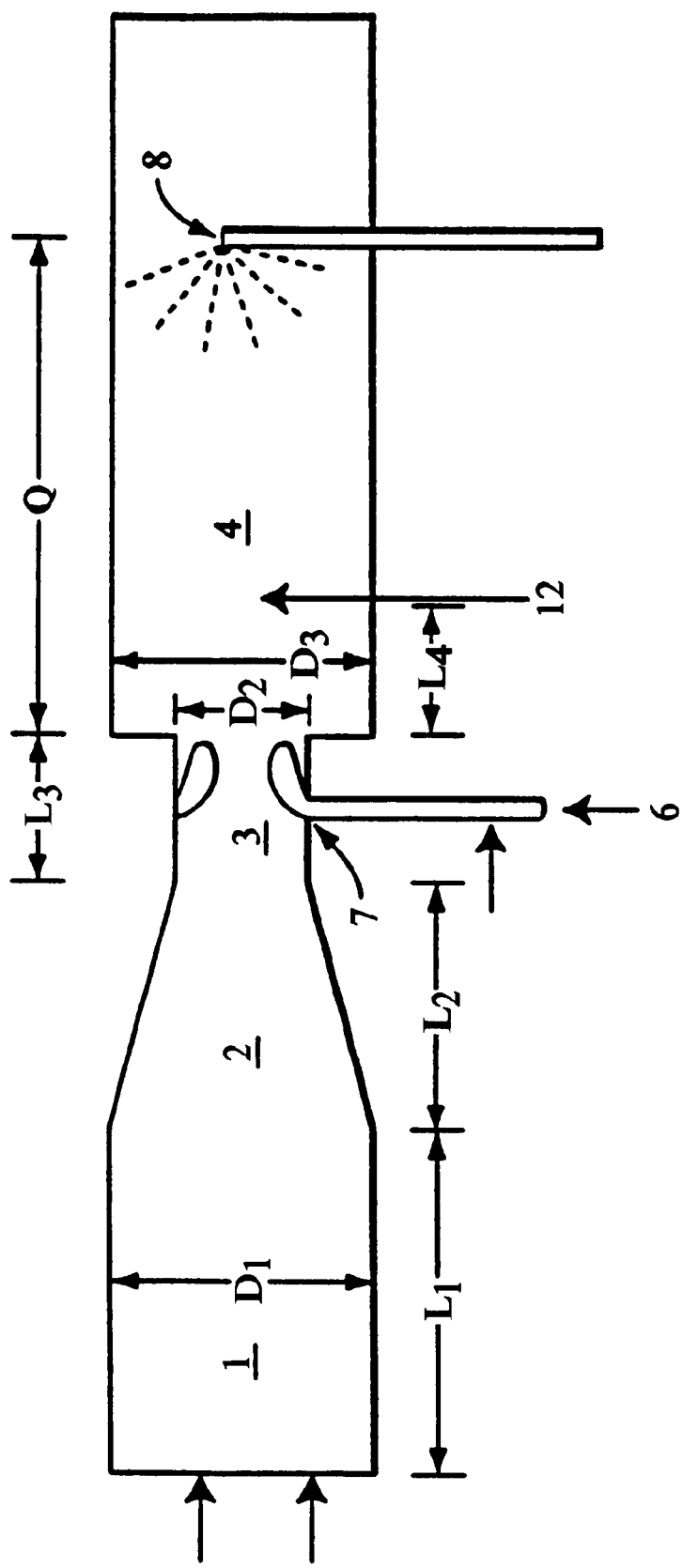
FIG. 1 is a schematic view of an operating portion of one type of carbon black reactor which may be used to produce treated carbon blacks suitable for use in elastomer compositions of the present invention.

The multi-stage process or method for producing substantially unvulcanized elastomer composition typically will produce a so-called base compound, that is, an elastomer composition comprising substantially all components or ingredients necessary for subsequent vulcanization. Such base compound may be suitable for room temperature cure or vulcanization, or more typically, for vulcanization at elevated temperatures in a forming mold, e.g., to produce motor vehicle tire tread. Alternatively, in certain preferred embodiments, the multi-stage process produces a masterbatch lacking at least one component or ingredient necessary for vulcanization. Such masterbatch can be combined with the required additional vulcanization ingredients, typically during one or more subsequent thermomechanical working stages.

Numerous suitable sulfur crosslinkable hydrocarbon elastomers for the elastomer composition are commercially available. Suitable elastomers include both natural and synthetic elastomers. The elastomer must, of course, be suitable for coagulation by the selected particulate filler and must be suitable for the intended purpose or application of the final rubber product. It will be within the ability of those skilled in the art to select suitable elastomer or a suitable blend of elastomers for use in the methods and apparatus disclosed here, given the benefit of this disclosure. Exemplary suitable hydrocarbons include but are not limited to, rubbers, and homo-polymers, co-polymers, terpolymers, etc., of 1,3-butadiene, styrene, isobutylene, 2,3-dimethyl-1,3-butadiene, acrylonitrile, ethylene, propylene and suitable mixtures of one or more of these. Preferably, the elastomer has a glass transition temperature (Tg) as measured by differential scanning colorimetry (DSC) ranging from about −120° C. to about 0° C. or above. Examples include, but are not limited to, styrene-butadiene rubber (SBR), natural rubber, polybutadiene, poly (styrene co-butadiene) polyisoprene, ethylene-propylene copolymer, isobutylene, isopropylene and their oil-extended derivatives. Blends of any of the foregoing may also be used.

Among the rubbers suitable for use with the present invention are natural rubber, and its derivatives, such as chlorinated rubber. Also suitable are synthetic rubbers, such as copolymers of from about 10 to about 70 percent by weight of styrene and from about 90 to about 30 percent by weight of butadiene, copolymer of 19 parts styrene and 81 parts butadiene, a copolymer of 30 parts styrene and 70 paris butadiene, a copolymer of 43 parts styrene and 57 parts butadiene, and a copolymer of 50 parts styrene and 50 parts butadiene; polymers and copolymers of such conjugated dienes such as polybutadiene, polychloroprene, and the like; and copolymers of conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5- vinyl pyridine, alkyl-substituted acrylates, vinyl ketone, methyl isopropenyl ketone, methyl vinyl ether, alpha-methylene carboxylic acids, and the esters and amides thereof, such as acrylic acid and dialkylacrylic acid amide. Also suitable for use herein are copolymers of ethylene and other high alpha olefins such as propylene and butene-1. Additional suitable elastomers will be readily apparent to those skilled in the art given the benefit of this disclosure. As noted further below, the elastomer compositions of the present invention can contain, in addition to the elastomer and filler, curing agents, a coupling agent, and optionally, various processing aids, oil extenders and anti-degradents.

Suitable sulfur crosslinking agents to be added to and dispersed into the sulfur crosslinkable hydrocarbon elastomer by thermomechanical working in the first or other early stage (i.e., a non-last stage) of the multi-stage process disclosed here for producing unvulcanized elastomer composition, are commercially available. The particular sulfur crosslinking agent(s) employed will be selected, typically, based at least in part on the elastomer and other ingredients selected for use in the co.mposition, and on the intended end use, etc. Exemplary sulfur crosslinking agents include sulfur and such sulfur donors as tetramethylthiuramdisulfide (TMTD), DTDM and the like. Additional suitable sulfur crosslinking agents will be readily apparent to those skilled in the art given the benefit of this disclosure. In this regard, it is recognized that suitable sulfur crosslinking agents include vulcanization agents, such as sulfur, which are well known for addition to an elastomer masterbatch during final mechanical working to produce a vulcanizable composition. Such late or last stage addition typically involves a vulcanization system or set of ingredients including, in addition to the sulfur or other vulcanization agent, accelerators effective to accelerate the vulcanization action of the sulfur when the elastomer composition is subsequently vulcanized, such as, for example, any of the sulfenamide accelerators. In the multi-stage processes and materials disclosed here, suitable vulcanization additives may be correspondingly added in a later or, preferably, last mechanical working stage of the multi-stage process. Such vulcanization additives may include sulfur and/or other sulfur-donor additional to the sulfur crosslinking agent added—in accordance with the present invention—during the first or other early stage of the multi-stage process.

The present invention presents a significant advance in the art, in that the advantages in end product performance characteristics, such as improved abrasion resistance and/or improved (i.e., lower) high temperature hysteresis, especially for tire tread applications, achieved through early stage addition of sulfur crosslinking agent in a multi-stage process, have not heretofore been recognized. In particular, it has not heretofore been recognized to add and substantially homogeneously disperse sulfur or sulfur donor crosslinking agent with particulate mineral filler into accelerator-free elastomer. The term "accelerator-free elastomer" here means sulfur crosslinkable hydrocarbon elastomer substantially free of any accelerator which would be effective to accelerate vulcanization action of such crosslinking agent in that elastomer. Thus, thermomechanical working of the elastomer, even at a temperature which would be sufficient to vulcanize the elastomer in the presence of a vulcanizing system including both the crosslinking agent and a suitable accelerator, is achieve-d as a non-productive step, at least in part by exclusion of such accelerator and/or other components of an effective vulcanization system for the elastomer.

A masterbatch comprising the sulfur crosslinking agent and filler highly or well dispersed in substantially accelerator-free unvulcanized elastomer can be produced by thermomechanical working employing known equipment and techniques. Typically, for example, mechanical working in a suitable mixer, such as an internal mixer or extruder will be carried out for a suitable period of time, generally having a duration of 10 seconds to 20 minutes, and reaching a maximum temperature between 130° C. and 180° C. It will be understood that the precise processing parameters will depend in part on the performance characteristics of the mixing apparatus and the filler loading level, as well as the performance characteristics and morphology desired in the resultant masterbatch. In general, the thermomechanical working should achieve an excellent dispersing of the filler and sulfur crosslinking agents, and reactive intermixing. A suitable multi-step thermomechanical working process is disclosed, for example, in U.S. Pat. No. 5,227,425 to Rauline, the disclosure of which is hereby incorporated by reference. It will be within the ability of those skilled in the art, given the benefit of the present disclosure, to determine suitable thermomechanical mixing parameters for a given application. It is significant in this regard, that the early stage during which the sulfur-crosslinking agent is added is a non-productive working stage. The term non-productive working stage is used here to mean a working stage which yields a masterbatch or base composition which is substantially unvulcanized. The resulting masterbatch can then be further processed and subsequently vulcanized in accordance with known materials and techniques. Thus, the masterbatch produced by such early stage thermomechanical working is substantially un-vulcanized. The term substantially unvulcanized means the masterbatch produced by the early stage working is suitable for subsequent processing, such as further mechanical working, extrusion, calendering, molding, etc. Likewise, the base compound produced by the multistage process disclosed here is substantially unvulcanized in the sense that it also is suitable for such further processing. Substantially unvulcanized base compound produced by the completed multi-stage process can be vulcanized in accordance with known techniques using commercially known vulcanization systems suited to the choice of elastomer(s). In that regard, it should be recognized that some portion of the sulfur crosslinking agent may be present in its original chemical state in the unvulcanized base compound and even in subsequent elastomer products. Typically, however, the sulfur crosslinking agent is present in the base compound primarily as its reaction product with the other constituents of the composition.

The precise amount of sulfur crosslinking agent suitable for a given masterbatch will depend to an extent on the choice of materials, the intensity and duration of the thermomechanical working step to produce the masterbatch, and the performance characteristics and morphology desired in the intermediate and ultimate products. The last mentioned factor will depend in some measure, of course, on the intended application of the product, and the preferred ranges stated here are especially applicable to masterbatch compositions and base compositions intended for tire tread applications. Preferably, the sulfur crosslinking agent will be added during the first stage in an amount of about 0.05 phr to 10.0 phr, more preferably about 0.2 to 6.0 phr, e.g., if using sulfur 1.0 to 1.8 phr. It will be within the ability of those skilled in the art, given the benefit of the present disclosure, to determine suitable usage levels based on the particular materials chosen, the intended processing parameters and the intended results. In general, in an early stage composition as disclosed here, intended for use in preparing a tire tread elastomer, having about 30 to 120 phr carbon black, modified carbon black: or silica and employing natural rubber, SBR, BR or the like, sulfur or comparable sulfur donor will be used, for example, in an amount of about 0.2 to 10.0 phr, more preferably 0.2 phr to 6 phr.

In accordance with one example, the unsaturated elastomer is SBR, such as SBR having approximately 60% vinyl content, and sulfur is added in the first stage in an amount from 0.2 phr to 6 phr. Such first stage thernomechanical working remains substantially non-productive, notwithstanding that the working temperature reaches or exceeds the vulcanization temperature, although slight crosslinking may occur during this treatment. Without wishing to be bound by theory, it can be surmised that very few crosslinks are being added to the elastomer compositions The crosslinks at this stage are sufficiently few that processability is not significantly changed. An observed minor viscosity increase may be preventing or reducing reagglomeration of the filler aggregates with resultant low hysteresis at high temperature. In accordance with the principles discussed above, such addition of sulfur to the base composition is done without addition of cure activators or accelerators or the like to preserve the non-productive nature of the preliminary thermomechanical working of the base composition.

Irrespective of the underlying mechanism, it is highly significant that vulcanized elastomer compositions provided here in accordance w:ith preferred embodiments, are found to have significantly improved high temperature hysteresis and/or abrasion characteristics. Preferred embodiments illustrating these advantageous results are further disclosed in the examples below. These examples are intended as illustrations and not as limitations upon the scope of the invention.

The sulfur crosslinking agent can be provided in the form of a pre-blend, i.e., in substantially homogeneous admixture with the filler. Alteniatively, the filler and the sulfur crosslinking agent can be separately or individually added to the elastomer during the early stage thermomechanical working to prepare a masterbatch.

Particulate filler suitable for use in the multi-stage processes and materials disclosed here include, for example, carbon black. Also suitable are treated carbon blacks, such as silicon-treated carbon black, zinc-treated carbon black, aluminum-treated carbon black, and other metal-treated carbon blacks; and coated carbon blacks, such as silicon-coated carbon black; oxidized carbon black (optionally silicon containing); carbon black (optionally silicon-containing) having attached functional groups; and the like, all of which are referred to here collectively as "modified carbon blacks." Silica filler also is suitable for use, as are blends or mixtures of carbon blacks, modified carbon blacks and other fillers in the processes and materials disclosed here. Exemplary carbon black fillers include numerous commercially available materials, such as N660, N330, N234 and N110 and the like. Other suitable carbon blacks will be readily apparent to those skilled in the art in view of this disclosure.

Metal-treated carbon black aggregates do not represent a mixture of discrete carbon black aggregates and discrete metal-containing aggregates. Rather, the metal-treated carbon black aggregates of the present invention include at least one metal-containing region concentrated at or near the surface of the aggregate (but part of the aggregate) or within the aggregate. Thus, the metal-treated carbon black aggregates can be described as aggregates comprising a carbon phase and a metal-containing species phase. The aggregates thus contain at least two phases, one of which is carbon and the other of which is a metal-containing species. The metal-containing species phase that is part of the aggregate is not attached to a carbon black aggregate like a silane coupling agent, but actually is part ofthe same aggregate as the carbon phase. Further, it is within the bounds of the present invention to have a metal-treated. carbon black containing more than one type of a metal-containing species phase or the metal-treated carbon black can also contain a silicon-containing species phase and/or a boron-containing species phase. For example, the metal-treated carbon black of the present invention can have an aggregate comprising a carbon phase, an aluminum-containing species phase, and a zinc-containing species phase. Accordingly, the metal-treated carbon black of the present invention can have two or more different types of metal-containing species phases and/or additional non-metal species phases.

The metal-treated carbon blacks of the present invention may be made by introducing a volatilizable metal-containing compound into the carbon black reactor at a point upstream of the quench zone. Useful volatilizable compounds (i.e., the metal-containing compounds) include any compound, which is volatilizable at carbon black reactor temperatures. Examples include volatilizable or decomposable compounds containing aluminum, zinc, magnesium, calcium, titanium, vanadium, cobalt, nickel, zirconium, tin, antimony, chromium, neodymium, lead, tellurium, barium, cesium, iron, and molybdenum. Specific examples include, but are not limited to, butoxides such as Aluminum III n-Butoxide and Aluminum III s-Butoxide., and propoxides, such as Al III iso-propoxide. Examples of suitable zinc-containing compounds include, but are not limited to zinc napthenate and zinc octoate. Other examples include, but are not limited to magnesium ethoxide, magnesium isopropoxide, calcium propoxide, titanium isopropoxide, cobaltous napthenate, tin diethyl oxide, neodymium oxalate, and the like. The flow rate of the volatilizable compound will determriine the weight percent of metal in the treated carbon black. The weight percent of the elemental metal (e.g., elemental aluminum or zinc) in the treated carbon black generally ranges from about 0.1% to 25%, by weight, of the aggregate, but may be adjusted to any desired level, such as up to 50% by weight, greater than 50% by weight, or up to 99% by weight of the aggregate.

Besides volatalizable compounds, decomposable metal-containing compounds which are not necessarily volatilizable can also be used to yield the metal-treated carbon black. As discussed in further detail below, if the volatilizable compound is introduced substantially simultaneously with the feedstock, the metal-treated regions are distributed throughout at least a portion of the carbon black aggregates.

Further, with respect to the morphology and manufacture of the metal-treated and silicon-treated carbon blacks, and taking silicon-treated carbon black as a representative example, a silicon-containing species, including but not limited to oxides and carbides of silicon (e.g., silica), are distributed in at least a portion of a carbon black aggregate as an intrinsic part of the carbon black. The silicon-treated carbon black may have silicon-containing regions primarily at the surface of the carbon black aggregates, or distributed throughout the aggregates, or both. Mixtures of different types of silicon-containing carbon blacks also may be used. The silicon-treated carbon black aggregates are not merely a mixture of discrete carbon black aggregates and discrete silica aggregates. Rather, the silicon-treated carbon black aggregates employed in the compositions disclosed here include at least one silicon-containing region either at the surface of or within the carbon black aggregate. When the silicon-tr(eated carbon black is examined under STEM-EDX, the silicon signal corresponding to the silicon-containing species is found to be present in individual carbon black aggregates, meaning that the silicon-containing species is an intrinsic part of the carbon black aggregate. By comparison, for example, in a physical mixture of silica and carbon black, STEM-EDX examination reveals distinctly separate silica and carbon black aggregates.

Treated carbon blacks may by obtained by manufacturing carbon black in the presence of suitable volatilizable compounds, e.g., a volatilizable silicon-containing compound to produce silicon-treated carbon black. Suitable methods are described, for example, in U.S. patent application Ser. No. 08/446,141 entitled "Elastomer compositions Incorporating Silicon Treated Carbon Blacks." Such carbon blacks are preferably produced in a modular or "staged" furnace carbon black reactor as depicted in FIG. 1. The furnace carbon black reactor has a combustion zone 1, with a zone of converging diameter 2; a feedstock injection zone with restricted diameter 3; and a reaction zone 4. To produce carbon blacks with such reactors, hot combustion gases are generated in combustion zone 1 by contacting a liquid or gaseous fuel with a suitable oxidant stream such as air, oxygen, or mixtures of air and oxygen. Among the fuels suitable for use in contacting the oxidant stream in combustion zone 1, to generate the hot combustion gases, are included any readily combustible gas, vapor, or liquid streams such as natural gas, hydrogen, methane, acetylene, alcohols, or kerosene. It is generally preferred, however, to use fuiels having a high content of carbon-containing components, in particular, hydrocarbons. Preferred carbon black feedstocks include petroleum refinery sources such as decanted oils from catalytic cracking operations, as well as the by-products from coking operations and olefin manufacturing operations. The ratio of air to fuel varies with the type of fuel utilized. When natural gas; is used to produce the carbon blacks, the ratio of air to fuel may be from about 10:1 to about 1000: 1. To facilitate the generation of hot combustible gases, the oxidant stream may be pre-heated. The hot combustible gas stream flows downstream from zones 1 and 2 into zones 3 and 4. The direction of the flow of hot combustion gases is shown in FIG. 1 by the arrow. Carbon black feedstock 6 is introduced at point 7 into the feedstock injection zone 3. The feedstock is injected into the gas stream through nozzles designed for optimal distribution of the oil in the gas stream. Such nozzles may be either sin,ole or bi-fluid. Bi-fluid nozzles may use a steam of air to atomize the fuel. Single-fluid nozzles may be adapted to inject pressure atomized feedstock or the feedstock can be directly injected into the gas-stream.

The mixture of carbon black-yielding feedstock atnd hot combustion gases flows downstream through zone 3 and 4. In the reaction zone portion of the reactor, the feedstock is pyrolized to carbon black. The reaction is arrested in the quench zone of the reactor. Quench 8 is located downstream of the reaction zone and sprays a quenching fluid, generally water, into the stream of newly formed carbon black particles. The quench serves to cool the carbon black particles and to reduce the temperature of the gaseous stream and decrease the reaction rate. The distance from the beginning of reaction zone 4 to quench point 8, referred to here as distance "Q," will vary according to the position of the quench. Optionally, quenching may be staged, or take place at several points in the reactor.

After the carbon black is quenched, the cooled gases and carbon black pass downstream into any conventional cooling and separating means whereby the carbon black is recovered. The separation of the carbon black from the gas stream is readily accomplished by conventional means such as a precipitator, cyclone separator, bag filter or other means known to those skilled in the art. After the carbon black has been separated from the gas stream, it is generally subjected to a pelletization step.

Silicon-treated carbon blacks suitable for use in the processes and materials disclosed here can be made by introducing a volatilizable silicon-containing compound into the carbon black reactor at a point upstream of the quench zone. Useful silicon-containing feeds are volatilizable at carbon-black reactor temperatures. Examples include, but are not limited to, silicates such as tetraethoxy orthosilicate (TEDS) and tetramethoxy orthosilicate, silanes such as tetrachlorosilane and trichloromethylsilane, and volatile silicone polymers such as octamethylcyclotetrasiloxane (OMTS). The flow rate of the volatilizable compound will determine the weight percent of silicon in the treated carbon black. The weight percent of silicon in the treated carbon black should range from about 0.1% to 25%, and preferably about 0.5% to about 10%, and most preferably about 2% to about 6%. It has been found that injecting silicon containing compound into the carbon black reactor results in an increase in the structure (e.g., CDBP) of the product. This is desirable in many applications of carbon black.

The volatilizable compound may be pre-mixed with the carbon black-forming feedstock and introduced with the feedstock into the reaction zone. Alternatively, the volatilizable compound may be introduced to the rea(tion zone separately form the feedstock injection point. Such introduction may be upstream or downstream from the feedstock injection point, provided the volatilizable compound is introduced upstream from the quench zone. For example, referring to FIG. 1, the volatilizable compound may be introduced to zone Q at point 12 or any other point in the zone. Volatilization and exposure to high temperatures in the reaction zone yields silicon-treated carbon black, such that the silicon or silicon containing species becomes an intrinsic part of the carbon black. Besides volatalizable compounds, decomposable compounds which are not necessarily volatilizable can also be used to yield the silicon-treated carbon black. If the volatilizable compound is introduced substantially simultaneously with the feedstock, the silicon-treated regions are distributed throughout at least a portion of the carbon black aggregate. Other suitable treated carbon black fillers can be produced using the equipment described above and analogous reactants.

In a second approach, the volatilizable compound is introduced to the reaction zone at a point after the carbon black formation has commenced but before the reactor stream has been subjected to the quench. Silicon-treated carbon black aggregates are then obtained in which a silicon-containing species is present primarily at or near the surface of the carbon black aggregate.

It has been found by the present inventors that one or more coupling agents may be used in the multi-stage process of the invention to further enhance the properties of the elastomer composition. Coupling agents, as used herein, include, but are not limited to, compounds that are capable of coupling fillers such as carbon black or silica to an elastomer. Coupling agents useful for coupling silica or carbon black to an elastomer are expected to be useful with the treated carbon blacks, such as silicon-treated carbon blacks. Usefuil coupling agents include, but are not limited to, silane coupling agents such as bis(3-triethoxysilylpropyl) tetrasulfane (Si-69), 3-thiocyanatopropyl-triethoxy silane (Si-264, from Degussa AG, Germany), γ-mercaptopropyl-trimethoxy silane (A189, from Union Carbide Corp., Danbury, Conn.); zirconate coupling agents, such as zirconium dineoalkanolatodi(3-mercapto-) propionato-O (NZ 66A, from Kenrich Petrochemicals, Inc., of Bayonne, N.J.); titanate coupling agents; nitro coupling agents, such as N,N'-bis(2-methyl-2-nitropropyl)-1,6-diaminohexane (Sumifine 1162, from Sumitomo Chemical Co., Japan); and mixtures of any of the foregoing. The coupling agents may be provided as a mixture with a suitable carrier, for example X50-S which is a mixture of Si-69 and N330 carbon black, available from Degussa AG.

Optionally, the filler, such as carbon black or treated carbon black, used in the novel multi-stage process of the present invention may be oxidized. Suitable oxidizing agents include, but are not limited to, nitric acid and ozone. Coupling agents which may be used with the oxidized silicon-treated fillers include, but are not limited to, the coupling agents set forth above.

Also, as noted above, suitable carbon blacks and modified carbon blacks may have attached functional organic groups. One process for attaching an organic group to the carbon black (reference to carbon black in this discussion of fillers having attached organic groups includes suitable modified carbon blacks, such as suitable silicon-containing carbon blacks) involves the reaction of at least one diazonium salt with a carbon black in the absence of an externally applied current sufficient to reduce the diazonium salt. This is, the reaction between the diazonium salt and the carbon black proceeds without an external source of electrons sufficient to reduce the diazoniuri salt. Mixtures of different diazonium salts may be used in the process of the inventicn. This process can be carried out under a variety of reaction conditions and in any type of reaction medium, including both protic and aprotic solvent systems or slurries. In another process, at least one diazonium salt reacts with a carbon black in a protic reaction medium. Mixtures of different diazonium salts may be used in this process of the invention. This process can also be carried out under a variety of reaction conditions. Preferably, in both processes, the diazonium salt is formed in siiti. If desired, in either process, the carbon black product can be isolated and dried by means known in the art. Furthermore, the resultant carbon black product can be treated to remove impurities by known techniques. The various preferred embodiments of these processes are discussed below. These processes can be carried out under a wide variety of conditions and in general are not limited by any particular condition. The reaction conditions must be such that the particular diazonium salt is sufficiently stable to allow it to react with the carbon black. Thus, the processes can be carried out under reaction conditions where the diazonium salt is short lived. The reaction between the diazonium salt and the carbon black c,ccurs, for example, over a wide range of pH and temperature. The processes can be carried out at acidic, neutral, and basic pH. Preferably, the pH ranges from about 1 to 9. The reaction temperature may preferably range from 0° C. to 100° C.

Diazonium salts, as known in the art, may be formed for example by the reaction of primary amines with aqueous solutions of nitrous acid. A general discussion of diazonium salts and methods for their preparation is found in Morrison and Boyd, *Organic Chemistry*, 5th Ed., pp. 973–983, (Allyn and Bacon, Inc. 1987) and March, *Advanced Organic Chemistry Reactions Mechanisms, and Structures*, 4th Ed., (Wiley, 1992). According to this invention, a diazonium salt is an organic, compound having one or more diazonium groups. The diazonium salt may be prepared prior to reaction with the carbon black, or more preferably, generated in situ using techniques known in the art. In situ generation also allows the use of unstable diazonium salts such as alkyl diazonium salts and avoids unnecessary handling or manipulation of the diazonium salt. In particularly preferred processes, both the nitrous acid and the diazonium salt are generated in sitll. A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as, for example, isoamylnitrite or ethylnitrite. The acid may be any acid, inorganic or organic, which is effective in the generation of the diazonium salt. Preferred acids include nitric acid, $HNO_3$, hydrochloric acid, HCI, and sulfuric acid, $H_2SO_4$. The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt. Generating the diazonium sallt in the presence of excess HCl may be less preferred than other alternatives because HCl is corrosive to stainless steel. Generation of the diazonium salt with $NO_2/H_2O$ has the additional advantage of being less corrosive to stainless steel or other metals commonly used for reaction vessels. Generation using $H_2SO_4/NaNo_2$ or $HNO_3/NaNO_2$ are also relatively non-corrosive.

In general, generating a diazonium salt from a primary amine, a nitrite, and an acid requires two equivalents of acid based on the amount of anine used. In an in situ process, the diazonium salt can be generated using one equivalent of the acid. When the primary amine contains a strong acid group, adding a separate acid may not be necessary. The acid group or groups of the primary amine can supply one or both of the needed equivalents of acid. When the primary amine contains a strong acid group, preferably either no additional acid or up to one equivalent of additional acid is added to a process of the invention to generate the diazonium salt itn situ. A. slight excess of additional acid may be used. One example of such a primary amine is para-aminobenzenesulfonic acid (sulfanilic acid).

In general, diazonium salts are thermally unstable. They are typically prepared in solution at low temperatures, such as 0–5° C., and used without isolation of the salt. Heating solutions of some diazonium salts may liberate nitrogen and form either the corresponding alcohols in acidic media or the organic Free radicals in the basic media. However, the diazonium salt need only be sufficiently stable to allow reaction with the carbon black. Thus, the processes can be carried out with some diazonium salts otherwise considered to be unstable and subject to decomposition. some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes. Reagents can be added to form the diazonium salt in situ, to a suspension of carbon black in the reaction medium, for examnple, water. Thus, a carbon black suspension to be used may already contain one or more reagents to generate the diazonium salt and the process accomplished by adding the remaining reagents.

Reactions to form a diazonium salt are compatible with a large variety of functional groups commonly found on organic compounds. Thus, only the availability of a diazonium salt for reaction with a carbon black limits the processes of the invention. The processes can be carried out in any reaction medium which allows the reaction between the diazonium salt and the carbon black to proceed. Preferably, the reaction medium is a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF). Acetonitrile, and benzonitrile. For a discussion of protic and aprotic solvents see Morrison and Boyd, *Organic Chemistry*, 5th Ed., pp. 228–231, (Allyn and Bacon, Inc. 1987). The processes are preferably carried out in a protic reaction medium, that is, in a protic solvent alone or a mixture of solvents which contains at least one protic solvent. Preferred protic media include, but are not limited to water, aqueous media containing water and other solvents, alcohols, and any media containing an alcohol, or mixtures of such media.

The reaction between a diazonium salt and a carbon black can take place with any type of carbon black, for example, in fluffy or pelleted form. In one embodiment designed to reduce production costs, the reaction occurs during a process for forming carbon black pellets. For example, a carbon black product can be prepared in a dry drum by spraying a solution or slurry of a diazonium salt onto a carbon black. Alternatively, the carbon black product can be prepared by pelletizing a carbon blaick in the presence of a solvent system, such as water, containing the diazonium salt or the reagents to generate the diazonium salt in situ. Aqueous solvent systems are preferred. Accordingly, another embodiment provides a process for forming a pelletized carbon black comprising the steps of: introducing a carbon black and an aqueous slurry or solution of a diazonium salt into a pelletizer, reacting the diazonium salt with the carbon black to attach an organic group to the carbon black, and pelletizing the resulting carbon black having an attached organic group. The pelletized carbon black product may then be dried using conventional techniques. In general, the processes produce inorganic by-products, such as salts. Several possible ways to produce carbon black products without unwanted inorganic by-products or salts are as follows: First, the diazonium salt can be purified before use by removing the unwanted inorganic by-product using means known in the art. Second, the diazonium salt can be generated with the use of an organic nitrite as the diazotization agent yielding the corresponding alcohol rather than an inorganic salt. Third, when the diazonium salt is generated from an amine having an acid group and aqueous $NO_2$, no inorganic salts are formed. Other ways may be known to those of skill in the art. In addition to the inorganic by-products, these processes may also produce organic by-products. They can be removed, for example, by extraction with organic solvents. Other ways of obtaining products without unwanted organic by-products may be known to those of skill in the art and include washing ore removal of ions by reverse osmosis.

The reaction between a diazonium salt and a carbon black forms a carbon black product having an organic group attached to the carbon black. The diazonium salt may contain the organic group to be attached to the carbon black. It may be possible to produce the carbon black products of this invention by other means known to those skilled in the art.

The organic group may be an aliphatic group, a cyclic organic group, or an organic compound having an aliphatic portion and a cyclic portion. As discussed above, the diazonium salt employed in the processes can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (or example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyul, thienyl, thiazolyl, furyl, indolyl, and the like). As the stearic hindrance of a substituted organic group increases, the number of organic groups attached to the carbon black from the reaction between the diazonium salt and the carbon black may be diminished.

When the organic group is substituted, it may contain any functional group compatible with the formation of a diazonium salt. Prefi rred functional groups include, but are not limited to, R, OR, COR, COOR, OCOR, carboxylate salts such as COOLi, COONa, COOK, $COO^-NR_4^+$, halogen, CN, $NR_2$, $SO_3H$, sulfonate salts such as $SO_3Li$, $SO_3Na$, $SO_3K$, $SO_3^-NR_4^+$, $OSO_3H$, $OSO_3^-$ salts, NR(COR), $CONR_2$, $NO_2$, $PO_3H_2$, phosphonate salts such as $PO_3HNa$ and $PO_3Na_2$, phosphate salts such as $OPO_3HNa$ and $OPO_3Na_2$, N=NR, $NR_3^+X^-$, $PR_3$, $^+X^-$, $S_kR$, $SSO_3H$, $SSO_3^-$ salts, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, and $SO_2R$. R and R', which can be the same or different, are independently hydrogen, branched or unbranched $C_1$–$C_{20}$ substituted or unsubstituted, saturated or unsaturated hydrocarbon, e.g., alkyl, alkenyl, alkynyl, substituted or unsubstituted aryl, substituted or unsubstituted heteroaryl, substituted or unsubstituted alkylaryl, or substituted or unsubstituted arylalkyl, The integer k ranges from 1–8 and preferably from 2–4. The anion $X^-$ is a halide or an anion derived from a mineral or organic acid. Q is $(CH_2)_w$, $(CH_2)_xO(CH_2)_z$, $(CH_2)_xNR(CH_2)_z$, or $(CH_2)_xS(CH_2)_z$, where w is an integer from 2 and 6 and x and z are integers from 1 to 6.

A preferred organic group is an aromatic group of the formula $A_yAr^-$, which corresponds to a primary amine of the formula $A_yArNH_2$. In this formula, the variables have the following meanings: Ar is an aromatic radical such as an aryl or heteroaryl group. Preferably, Ar is selected from the group consisting of phenyl, naphthyl, anthracenyl, phenanthrenyl, biphenyl, pyridinyl, benzothiadiazolyl, and benzothiazolyl; A is a substituent in the aromatic radical independently selected from a preferred functional group described above or A is a linear, branched or cyclic hydrocarbon radical (preferably containing 1 to 20 carbon atoms), unsubstituted or substituted with one or more of those functional groups; and y is an integer from 1 to the total number of —CH radicals in the aromatic radical. For instance, y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl. In the above formula, specific examples of R and R' are $NH_2$—$C_6H_4$—, $CH_2CH_2$—$C_6H_4$—$NH_2$, $CH_2$—$C_6H_4$—$NH_2$, and $C_6H_5$.

Another preferred set of organic groups which may be attached to the carbon black are organic groups substituted with an ionic or an ionizable group as a functional group. An ionizable group is one which is capable of forming an ionic group in the medium of use. The ionic group may be an anionic grcup of a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such as organic group has a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Prefer-ably, the aromatic group of the organic group is directly attached to the carbon black. The aromatic group may be further substituted or unsubstituted, for example, with alkyl groups. More preferably, the organic group is a phenyl or a naphthyl group, or a carboxylic acid group. Examples of these acidic groups and their salts are discussed above. Most preferably, the organic group is a substituted or unsubstituted sulfophenyl group or a salt thereof, a substituted or unsubstituted (polysulfo)phenyl group or a salt thereof, a substituted or unsubstituted sulphonaphthyl group or a salt thereof; or a substituted or unsubstituted (polysulfo)naphthyl group or a salt thereof A preferred substituted sulfophenyl group is hydroxysulfophenyl group or a salt thereof.

Specific organic groups having an ionizable functional group forming an anion (and their corresponding primary arines) are p-sulfophenyl (p-sulfanilic acid), 4-hydroxy-3-sulfophenyl (2-hydroxy-5-amino-benzenesulfonic acid), and 2-sulfoethyl (2-aminoethanesulfonic acid). Other organic groups having ionizable functional groups forming anions can also be used.

Amines represent examples of ionizable functional groups that form cationic groups. For example, amines may be protonated to form ammonium groups in acidic media. Preferably, an organic group having an amine substituent has a pKb of less than 5. Quaternary ammonium groups ($-NR_3^+$) also represent examples of cationic groups. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and even quaternized aromatic amines, can also be used as the organic group. Thus, N-substituted pyridinium compounds, such as N-methyl-pyiridyl, can be used in this regard. Examples of organic groups include, but are not limited to ($C_5H_4N$) $C_2H_5^-$, $C_6H_4(NC_5H_5)^+$, $C_6H_4COCH_2N(CH_3)_3^+$, $C_6H_4COCH_2(NC_5H_5)^+$, $(C_5H_4N)CH_3^+$, and $C_6H_4CH_2N(CH_3)_3^+$.

An advantage of the carbon black products having an attached organic group substituted with an ionic or an ionizable group is that the carbon black product may have increased water dispersibility relative to the corresponding untreated carbon black. Water dispersibility of a carbon black product increases with the number of organic groups attached to the carbon black having an ionizable group or the number of ionizable groups attached to a given organic group. Thus, increasing the number of ionizable groups associated with the carbon black product should increase its water dispersibility and permits control of the water dispersibility to a desired level. It can be noted that the water dispersibility of a carbon black product containing an amine as the organic group attached to the carbon black may be increased by acidifying the aqueous medium.

Because the water dispersibility of the carbon black products depends to some extent on charge stabilization, it is preferred that the ionic strength of the aqueous medium be less than 0.1 molar. More preferably, the ionic strength is less than 0.01 molar. When such a water dispersible carbon black product is prepared, it is preferred that the ionic or ionizable groups be ionized in the reaction medium. The resulting product solution or slurry may be used as is or diluted prior to use. Alternatively, the carbon black products may be dried by techniques used for conventional carbon blacks. These techniques include, but are not limited to, drying in ovens and rotary kilns. Overdrying, however, may cause a loss in the degree of water dispersibility. In addition to their water dispersibility, carbon black products having an organic group substituted with an ionic or an ionizable group may also be dispersible in polar organic solvents such as dimethylsulfoxide (DMSO), and formamide. In alcohols such as methanol or ethanol, use of complexing agents such as crown ethers increases the dispersibility of carbon black products having an organic group containing a metal salt of an acidic group.

Aromatic sulfides encompass another group of preferred organic groups. Carbon black products having aromatic sulfide groups are particularly useful in rubber compositions. These aromatic sulfides can be represented by the formulas $Ar(CH_2)_qS_k(CH_2)_rAr'$ or $A-(CH_2)_qS_k(CH_2)_rAr''$ wherein Ar and Ar' are independently substituted or unsubstituted arylene or heteroarylene groups, Ar" is an aryl or heteroaryl group, k is 1 to 8 and q and r are 0–4. Substituted aryl groups would include substituted alkylaryl groups. Preferred arylene groups include phenylene groups, particularly p-phenylene groups, or benzothiazo, lylene groups. Preferred aryl groups include phenyl, naphthyl and benzothiazolyl. The number of sulfurs present, defined by k preferably ranges from 2 to 4. Preferred carbon black products are those having an attached aromatic sulfide organic group of the formula $-(C_6H_4)-S_k-(C_6H_4)-$, where k is an integer from 1 to 8, and more preferably where k ranges from 2 to 4. Particularly preferred aromatic sulfide groups are bis-para-$(C_6H_4)-S_2-(C_6H_4)-$ and para-$(C_6H_4)-S_2-(C_6H_5)$. The diazonium salts of these aromatic sulfide groups may be conveniently prepared from their correspondingly primary amines, $H_2N-Ar-S_k-Ar'-NH_2$ or $H_2N-Ar-S_k-Ar''$. Preferred groups include dithiodi-4,1-phenylene, tetrathiodi-4,1-phenylene, phenyldithiophenylene, dithiodi-4,1-(3-chlorophenylene), -(4-$C_6H_4$)-S—S-(2-$C_7H_4NS$), -(4-$C_6H_4$)-S—S-(4-$C_6H_4$)-OH, -6-(2-$C_7H_3NS$)—SH, -(4-$CH_6H_4$)—$CH_2CH_2$—S—S—$CH_2CH_2$-(4-$C_6H_4$)—, -(4-$C_6H_4$)—$CH_2CH_2$—S—S—S—$CH_2CH_2$-(4-$C_6H_4$)—, -(2-$C_6H_4$)—S—S-(2-$C_6H_4$)—, -(3-$C_6H_4$)—S—S-(3-$C_6H_4$)—, -6-($C_6H_3N_2S$), -6-(2-$C_7H_3NS$)—S—NRR' where RR' is —$CH_2CH_2OCH_2CH_2$—, -(4-$C_6H_4$)—S—S—S—S-(4-$C_6H_4$)—, -(4-$C_6H_4$)$_{S-SO_3}$H, -(4-$C_6H_4$)—$SO_2NH$-(4-$C_6H_4$)—S—S-(4-$C_6H_4$)—$NHSO_2$-(4-$C_6H_4$)—, -6-(2-$C_7H_3NS$)—S—S-2-(6-$C_7H_3NS$)—, -(4-$C_6H_4$)—S—$CH_2$-(4-$C_6H_4$)—, -(4-$C_6H_4$)—, -(4-$C_6H_4$)—$SO_2$—S-(4-$C_6H_4$)—, -(4-$C_6H_4$)—$CH_2$—S—$CH_2$-(4-$C_6H_4$)—, -(3-$C_6H_4$)—$CH_2$—S—$CH_2$-(3-$C_6H_4$)—$CH_2$—S—$CH_2$-(3-$C_6H_4$)—, -(4-$C_6H_4$)—$CH_2$—S—S—$CH_2$-(4-$C_6H_4$)—, -(3-$C_6H_4$)—$CH_2$—S—S—$CH_2$-(3-$C_6H_4$)—, -(4-$C_6H_4$)—S—NRR' where RR' is —$CH_2CH_2OCH_2CH_2$—, —($C_6H_4$)—$SO_2NH-CH_2CH_2$—S—S—$CH_2CH_2-NHSO_2$-(4$C_6H_4$)—, -(4-$C_6H_4$)-2-(1,3-dithianyl;), and -(4-$C_6H_4$)—S-(1,4-piperizinediyl)—S-(4-$C_6H_4$)—.

Another preferred set of organic groups which rmay be attached to the carbon black are organic groups having an aminophenyl, such as ($C_6H_4-NH_2$, ($C_6H_4$)—$CH_2$—($C_6H_4$)—$NH_2$, ($C_6H_4$)-$SO_2$—($C_6H_4$)—$NH_2$. Preferred organic groups also include aroma sulfides, represented by the formulas $Ar-S_N-Ar'$ or $Ar-S_N-Ar''$, wherein Ar and Ar' are independently arylene groups, Ar" is an aryl and n is 1 to 8. Methods for attaching such organic groups to carbon black are discussed in U.S. patent application Ser. Nos. 08/356,660, 08/572,525, and 08/356,459, the disclosures of which are fully incorporated by reference herein.

As stated earlier, treated carbon black may also be modified to have at least one organic group attached to the treated carbon black. A mixture of treated carbon black and a modified carbon black having at least one attached organic group also may be used.

Furthermore, it is within the bounds of this application to also use a mixture of silica and silicon-treated carbon black in the novel multi-stage process. Also, a combination of additional components with silicon-trealed carbon black or other treated carbon blacks may be used, such as one or more of the following:

a) silicon-treated carbon black with an attached organic group (optionally treated with silane coupling agent);
  b) modified carbon black having an attached organic group;
  c) silica;
  d) modified silica, for example, having an attached organic group; and/or
  e) carbon black.

Suitable silicon-treated carbon blacks having an organic group attached are disclosed in Patent Cooperation Treaty ("PCT") publication No. WO 96/18674, entitled "EPDM, HNBR and Butyl Rubber Composition,; Containing Carbon Black Products," the entire disclosure of which is hereby incorporated by reference herein. Preferred organic groups include aromatic sulfides, represented by the formulas Ar—$S_n$—Ar' or Ar—$S_n$—Ar", wherein Ar and Ar' are independently arylene groups, Ar" is an aryl and n is 1 to 8. Another set of organic groups which may be attached to the silicon-treated carbon black fillers are organic groups substituted with an ionic or an ionizable group as a functional group, as disclosed, for example, in U.S. patent application Ser. No. 356,660, filed Dec. 15, 1994 and entitled "Reaction of Carbon Black with Diazonium Salts, Resultant Carbon Black Products and Their Uses", the entire disclosure of which is hereby incorporated herein by reference. Likewise, silicon coated carbon blacks may have attached organic groups.

Examples of silicas which can be used in the novel multi-stage methods disclosed here include, but are not limited to, silica, precipitated silica, amorphous silica, vitreous silica, fumed silica, fused silica, silicates (e.g., alumino silicates) and other Si containing fillers such as clay, talc, wollastonite, etc. Silicas are commercially available from such sources as Cabot Corporation under the Cab-O-Sil® tradename, PPG Industries under the Hi-Sil and Ceptane tradenames; Rhone-Poulenc under the Zeosil tradename; and Degussa AG under the Ultrasil and Coupsil tradenames.

The loading level of carbon black, silica, modified carbon black and/or other particulate filler in the elastomer composition will deperLd on the specific materials selected for use and on the performance properties desired in the intended application. It will be within the ability of those skilled in the art, given the benefit of the present disclosure, to select suitable loading levels for a given application. Generally, for tire tread applications for example, 25 to 120 phr filler will be suitable, more preferably 35 to 90 phr filler. Other suitable fillers may be used instead of or in conjunction with the carbon black and/or silicon-treated carbon black particulate filler, such as various grades of silica suitable to the intended application of the composition. Preferably, such other filler(s) is a minor portion of the total filler content of the composition, such as less than one-half by weight.

As noted above, in accordance with one aspect olfthe present disclosure, a processable, substantially unvulcanized (but vulcanizable) base compound is formed by first preparing the above described early stage masterbatch and then forming the base compound in a subsequent non-productive working stage in accordance with the principles discussed above, including a finishing step in which a suitable accelerator system is added. The accelerator system is selected to be effective to vulcanize the elastomer at a suitable vulcanization temperature. The accelerator system may comprise, for example, sulfur or a sulfur donor, activators, accelerators and/or other ingredients suitable for vulcanization of the elastomer compositions. The thermomechanical working of the aforesaid finishing step is carried out preferably at a temperature below the vulcanization temperature to achieve substantially homogenous dispersion of the vulcanization system.

In accordance with certain preferred embodiments in the above-mentioned last stage of the multi-stage process, no additional crosslinker is added. That is, an accelerator is added which is effective to accelerate the sulfur crosslinking agent added to the elastomer composition in the early stage, but no more of that crosslinker or other crosslinking agent is added.

After such last stage, a vulcanized elastomer composition can be prepared by vulcanizing the product of the finishing step at a vulcanization temperature. The resultant elastomer compositions may be used for producing various elastomer products, such as vehicle tire tread, industrial rubber products, seals, timing belts, power transmission belting and the like, and other rubber goods. When utilized in tires, the elastomer compositions disclosed here also may be suitable for other tire components, for example, the carcass or sidewall.

It will be understood by those skilled in the art, given the benefit of the present disclosure, that the compositions disclosed here may further comprise any of various commonly used additive materials. Processing additives, for example, such as oils, resins, including tacifying resins, plasticizers, pigments, fatty acid, zinc oxide, waxes, antioxidants and anti-ozonants, peptizing agents, etc., may be employed in accordance with known techniques at appropriate points during processing. In this regard, in accordance with a significant feature of certain preferred embodiments, oil is added to the above described early stage composition. More specifically, oil is added to be present in the non-productive thermomechanical working of the early stage composition following addition and substantial dispersion (by thermomechanical working for a time after their addition) of the sulfuir crosslinking agent and filler. Preferably the sulfur crosslinking agent and filler are added in the first stage, as discussed above, and the oil is added at a later time during such first stage. Alternatively, the sulfur crosslinking agent and filler are added and substantially well dispersed in the elastomer in the first or other early stage (i.e., not the last working stage) of the multi-stage process, and the oil is added anad dispersed in any subsequent stage of the multi-stage process. Suitable oils are commercially available and known for use in elastomer compositions. Exemplary oils include aromatic oils, paraffin oils and the like, and suitable mixtures of any of them. Other suitable oils will be readily apparent to those skilled in the art in view of the present disclosure. The oil is used in the elastomer composition in an amount determined in large part by the choice of other ingredients and the desired performance characteristics of the intermediate and final products. Generally, the oil is used in conventional amounts. For elastomer compositions made by the process disclosed here and intended for use as tire tread, for example, comprising SBR rubber, carbon black or silicon-treated carbon black and sulfur crosslinking agent (and other ingredients to be added in a subsequent stage, such as a vulcanization system), oil typically would be added in an amount of about 0 to 50 phr, preferably about 0 to 40 phr. The sequence of addition of the oil in accordance with the preferred embodiments disclosed here is found to yield improved performance characteristics, as demonstrated by certain of the following examples.

It should also be understood that significant additional advantages are provided by various preferred embodiments, including the advantage of performance characteristics improved over those of otherwise corresponding elastomer composition not prepared in accordance with the early stage addition and dispersion of sulfur crosslinking agent and, optionally, the delayed addition and dispersion of oil. Most notably, for example, such improved performance characteristics are achieved in certain preferred embodiments even with elimination or reduction in usage amount of expensive coupling agents, such as product Si-69 and the like, discussed above, versus otherwise corresponding compositions not produced in accordance with the process disclosed here.

EXAMPLES

The following examples demonstrates the processes and materials disclosed above. The elastomers and other ingredients used in the examples are listed below, along with the abbreviations used for some of the ingredients.

The Elastomers Used For The Examples

SSBR—solution SBR Duradene 715 from Firestone Synthetic Rubber & Latex Co., Akron, Ohio, U.S.A.

FSSBR—functionalized solution SBR NS114 and/or NS 116, as indicated from Nippon Zeon Co., Japan.

ESBR—emulsion SBR 1500, from Copolymer Rubber & Chemicals, Corp., Baton Rouge, La., U.S.A.

BR—Polybutadiene Taktene, from Bayer Inc., Akron, Ohio, U.S.A.

Other Ingredients Used In The Examples

Carbon black VULCAN 7H®V(N234), from Cabot Corporation, Boston, Mass., U.S.A.

CRX 2000 —silicon-treated carbon black, from Cabot Corporation, Boston, Mass.

Silica ZEOSIL 1165—silica from Rhône-Poulenc, France.

Zinc oxide from New Jersey Zinc Co.

Stearic acid from Emery Chemicals, Cincinnati, Ohio, U.S.A.

Flexzone 7P®—N-(1,3-dimethyl butyl)-N'-phenyl-p-phenylene diamine, an anti-oxidant available from Uniroyal Chemical Co., Middlebury, Conn., U.S.A.

Durax(®—N-cyclohexane-2-benzothiazole sulph,-namide, an accelerator available from R.T. Vanderbilt Co., Norwalk, Conn., U.S.A.

Captax®—2-mercaptobenzothiazole, an accelerator available from R.T. Vanderbilt Co., Norwalk, Conn., U.S.A.

TMTD—Tetramethyl thiuram disulfide, an accelerator available from R.E. Carroll, Trenton, N.J., U.S.A.

Vanax DPG—Diphenyl guanidine, an accelerator available from R.T. Vanderbilt Co., Norwalk, Conn., U.S.A.

Si-69—bis(3-triethoxysilylpropyl)tetrasulfide, a coupling agent from Degussa AG, Germany.

X505—a mixture of Si-69/carbon black N330, 50/50 by weight, from Degussa AG, Germany.

Sundex 8125—highly aromatic oil, from R.E. Carroll, Trenton, N.J., U.S.A.

Sunproof imp.—Sunproof improved, a mixture of waxy materials, from Uniroyal Chemical Co., Middlebury, Conn., U.S.A.

Sulfur—crosslinking agent from R.E. Carroll, Trenton, N.J., U.S.A.

The elastomer compositions were prepared in groups or "series." The mixing procedure was the same (except as indicated below), for all examples of a given series. The mixing procedures were as follows:

Mixing Procedures

The compounds were prepared using either a two-stage or three-stage mixing procedure as indicated in the following tables, Table I-A through Table VI-A. The internal mixer used for preparing the compounds was a Plasti-Corder EPL-V (obtained from C.W. Brabender, South Hackensack, New Jersey) equipped with a cam-type mixing head (capacity 600 ml).

In the first stage, the mixer was set at 80° C. and the rotor speed was set at 60 rpm. After the mixer was conditioned to 100° C. by heating the chamber with a dummy mixture, the elastomer was loaded and masticated for 1 minute. Thereafter the mixing procedure in the first stage differed for different examples as described below. All amounts are shown in parts per hundred rubber (phr). In Table I-A through Table VI-A below, certain examples identified as "OF" show the improvement achieved by delayed addition of the oil during the first mixing stage. In examples indicated as "S1" the sulfur crosslinking agent was added during the first stage in accordance with the present invention. On Examples indicated as "S3" sulfui was added only as part of a complete vulcanization system during the third stage mix:ing.

The mixing time shown for each example in the following tables is the total mixing time of the first stage (in the case of two-stage mixing) or of the first two stages (in the case of three-stage mixing).

A-series of compounds (see Table I-A):

Standard mixing procedure: Carbon black, preblended with Sundex 8125 then added. Mixing was continued for an additional three minutes, achieving substantial dispersion of the filler. The resultant stage 1 masterbatch was then dumped from the mixer at four minutes total. The dump temperature was between 150–160° C. It was then passed through an open mill (four inch, two-roll mill, obtained from C.W. Brabender, South Hackensack, N.J.) three times and then stored at room temperature for two hours.

S1 mixing procedure: The same as standard mixing procedure except the sulfair was preblended with carbon black and added in the first stage. In the A-series of examples, all of which were 3-stage procedures, no sulfur was added in the second or third stage.

123% S1 mixing procedure: Same as S1 mixing procedure, except that (example compounds A3, A6 and A9) an additional 0.4 phr sulfur was added (as indicated); such additional sulfur was added in the first stage.

B-A-series of compound (see Table II-A):

Standard mixing procedure: Carbon black, pre-blended with Sundex 8125 was then added, mixing for an additional three minutes. The resultant stage 1 masterbatch was dumped from the mixer at four minutes total and then passed through an open mill three times and then stored it room temperature for two hours.

S1 mixing procedure: The same as B-A-series standard mixing procedure except the sulfur, preblended with carbon black and oil, was added in the first stage. In the B-A-series of examples, all of which were three stage procedures, no sulfur was added in the second or third stage of the S1 mixing procedure examples.

B-B-series of compounds (see Table III-A):
  S3-OF mixing procedure: Carbon black was then added. After mixing for an additional 2.5 minutes, or when the temperature reached about 160° C., the oil was added. The resultant stage 1 masterbatch was dumped from the mixer at eight minutes total, then passed through an open mill three times and stored at room temperature for two hours.
  S1-OF mixing procedure: The same as S3-OF mixing procedure except the sulfur, preblended with carbon black, was added in the first stage. In the B-B series of examples, all of which were 3-stage procedures, no sulfur was added in the second or third stage of the S1-OF mixing procedure examples.
C-series of compounds (see Table IV-A):
  S3-OF mixing procedure: The same as S3-OF mixing procedure for B-B series of compounds except the masterbatch was dumped from the mixer at nine minutes total.
  S1-OF mixing procedure: The same as S1-OF mixing procedure for B-B series of compounds except the masterbatch was dumped from the mixer at nine minutes total.
D-series of conmpounds (see Table V-A):
  Standard mixing procedure: Filler, e.g., carbon black, pre-blended with coupling agent (Si-69 or X50S, if any) and Sundex 8125 oil was then added, mixing for an additional seven minutes. The resultant stage 1 masterbatch was then dumped from the mixer at eight minutes total and then passed through an open mill three times and then stored at room temperature for two hours.
  S1-OF mixing procedure: The same as S1-OF mixing procedure for B-B series of compounds.
  S1-OF mixing procedure (and two stage mixing procedure for compound Do): The same as S1-OF mixing procedure for B-B series of compounds, but all other ingredients except accelerators were added after the first addition of oil.
E-series of compound (see Table VI-A):
  Standard mixing procedure: Carbon black filler, pre-blended with coupling agent (Si-69 if any) and Sundex 8125 oil was then added, mixing for an additional three minutes. The resultant stage 1 masterbatch was dumped from the mixer at four minutes total, then passed through an open mill three times and stored at room temperature for two hours.
  S1-OF mixing procedure: The same as S1-OF mixing procedure for B-B series of compounds.

In the second stage (of all 3-stage processes), the mixing chamber temperature was set to 80° C. and the rotor speed was set at 60 rpm. After the mixer was conditioned to 100° C. by heating the chamber with a dummy mixture, the masterbatch from first stage was loaded and masticated for 1 minute. The mixing procedure in the second stage differed for different examples as described below:
A-series (see Table I-A):
  After the stage 1 masterbatch was masticated for one minute, zinc oxide and stearic acid were added. Flexzone 7P was added one minute later. The masterbatch was then dumped from the mixer at four minutes total, then passed through an open mill three times, and then stored at room temperature for two hours.
B-A-series (see Table II-A):
  After the stage 1 masterbatch was masticated for one minute, zinc oxide and stearic acid were added. Flexzone 7P and Sunproof Improved were added at one minute later. The masterbatch was then dumped from the mixer at four minutes total, then passed through an open mill three times and stored at room temperature for two hours.
B-B-series (see Table III-A):
  The same as the mixing procedure of the second stage described for B-A-series of compounds.
C-series (see Table IV-A):
  The same as the mixing procedure of the second stake described for B-A-series of compounds.
D-series (see Table V-A):
  The same as the mixing procedure of the second stage described for B-A-series of compound, except for compound D7 there is no second stage.
E-series (see Table VI-A):
  The same as the mixing procedure of the second stage described for B-A-series of compounds.

In the last stage, the mixing chamber temperature was set to 80° C. and the rotor speed was set to 35 rpm. After the mixer was conditioned the masterbatch from stage two was loaded and mixed for one minute. The curative additive (including sulfur and accelerators for S3 and standard mixing procedures and only accelerators for S1 mixing procedures) was then added. The material was dumped from the mixer at two minutes and passed through the open mill three times.

TABLE I-A

Series A Compounds Formulations and Mixing Procedures

| Compound | A1 | A2 | A3 | A4 | A5 | A6 | A7 | A8 | A9 |
|---|---|---|---|---|---|---|---|---|---|
| FSSBR NS-118 | 70 | 70 | 70 | | | | 70 | 70 | 70 |
| FSSBR NS-114 | 30 | 30 | 30 | | | | 30 | 30 | 30 |
| SSBR Duradene 715 | | | | 100 | 100 | 100 | | | |
| Carbon black N234 | 50 | 50 | 50 | 50 | 50 | 50 | | | |
| CRX 2000 | | | | | | | 50 | 50 | 50 |
| Sulfur | | | 0.4 | | | 0.4 | | | 0.4 |
| Zinc Oxide | 3 | 3 | 3 | 3 | 3 | 3 | 3 | 3 | 3 |
| Stearic Acid | 2 | 2 | 2 | 2 | 2 | 2 | 2 | 2 | 2 |
| Flexzone 7p | 1 | 1 | 1 | 1 | 1 | 1 | 1 | 1 | 1 |
| Durax | 1.3 | 1.3 | 1.3 | 1.3 | 1.3 | 1.3 | 1.3 | 1.3 | 1.3 |
| Captax | 0.2 | 0.2 | 0.2 | 0.2 | 0.2 | 0.2 | 0.2 | 0.2 | 0.2 |
| Sulfur | 1.8 | 1.8 | 1.8 | 1.8 | 1.8 | 1.8 | 1.8 | 1.8 | 1.8 |

TABLE I-A-continued

Series A Compounds Formulations and Mixing Procedures

| Compound | A1 | A2 | A3 | A4 | A5 | A6 | A7 | A8 | A9 |
|---|---|---|---|---|---|---|---|---|---|
| Mixing | | | | | | | | | |
| Mixing procedure | Standard | S1 | 123% S1 | Standard | S1 | 123% S1 | Standard | S1 | 123% S1 |
| Mixing time (min.) | 8 | 8 | 8 | 8 | 8 | 8 | 8 | 8 | 8 |
| Total mixing stages | 3 | 3 | 3 | 3 | 3 | 3 | 3 | 3 | 3 |

TABLE II-A

Series B-A Compounds Formulations and Mixing Procedures

| Compound | B1-A | B2-A | B3-A | B4-A | B5-A | B6-A |
|---|---|---|---|---|---|---|
| SSBR Duradene 715 | 75 | 75 | | | | |
| FSSBR NS-116 | | | 75 | 75 | | |
| ESBR SBR 1500 | | | | | 75 | 75 |
| BR Taktene 1203 | 25 | 25 | 25 | 25 | 25 | 25 |
| Carbon black N234 | 75 | 75 | 75 | 75 | 75 | 75 |
| Sundex 8125 | 25 | 25 | 25 | 25 | 25 | 25 |
| Zinc Oxide | 3.5 | 3.5 | 3.5 | 3.5 | 3.5 | 3.5 |
| Stearic Acid | 2 | 2 | 2 | 2 | 2 | 2 |
| Flexzone 7p | 1.5 | 1.5 | 1.5 | 1.5 | 1.5 | 1.5 |
| Sunproof Imp. | 1.5 | 1.5 | 1.5 | 1.5 | 1.5 | 1.5 |
| Durax | 1.5 | 1.5 | 1.5 | 1.5 | 1.5 | 1.5 |
| TMTD | 0.4 | 0.4 | 0.4 | 0.4 | 0.4 | 0.4 |
| Sulfur | 1.4 | 1.4 | 1.4 | 1.4 | 1.4 | 1.4 |
| Mixing | | | | | | |
| Mixing procedure | Standard | S1 | Standard | S1 | Standard | S1 |
| Mixing time (min.) | 8 | 8 | 8 | 8 | 8 | 8 |
| Total mixing stages | 3 | 3 | 3 | 3 | 3 | 3 |

TABLE III-A

Series B-B Compounds Formulations and Mixing Procedures

| Compound | B1-B | B2-B | B3-B | B4-B | B5-B | B6-B |
|---|---|---|---|---|---|---|
| SSBR Duradene 715 | 75 | 75 | | | | |
| FSSBR NS-116 | | | 75 | 75 | | |
| ESBR SBR 1500 | | | | | 75 | 75 |
| BR Taktene 1203 | 25 | 25 | 25 | 25 | 25 | 25 |
| Carbon black N234 | 75 | 75 | 75 | 75 | 75 | 75 |
| Sundex 8125 | 25 | 25 | 25 | 25 | 25 | 25 |
| Zinc Oxide | 3.5 | 3.5 | 3.5 | 3.5 | 3.5 | 3.5 |
| Stearic Acid | 2 | 2 | 2 | 2 | 2 | 2 |
| Flexzone 7p | 1.5 | 1.5 | 1.5 | 1.5 | 1.5 | 1.5 |
| Sunproof Imp. | 1.5 | 1.5 | 1.5 | 1.5 | 1.5 | 1.5 |
| Durax | 1.5 | 1.5 | 1.5 | 1.5 | 1.5 | 1.5 |
| TMTD | 0.4 | 0.4 | 0.4 | 0.4 | 0.4 | 0.4 |
| Sulfur | 1.4 | 1.4 | 1.4 | 1.4 | 1.4 | 1.4 |
| Mixing | | | | | | |
| Mixing procedure | S3,FO | S1,FO | S3,FO | S1,FO | S3,FO | S1,FO |
| Mixing time (min.) | 12 | 12 | 12 | 12 | 12 | 12 |
| Total mixing stage | 3 | 3 | 3 | 3 | 3 | 3 |

TABLE IV-A

Series C Compounds Formulations and Mixing Procedures

| Compound | C1 | C2 | C3 | C4 |
|---|---|---|---|---|
| SSBR Duradene 715 | 75 | 75 | | |
| FSSBR NS-116 | | | 75 | 75 |
| BR Taktene 1203 | 25 | 25 | 25 | 25 |
| CRX 2000 | 75 | 75 | 75 | 75 |

TABLE IV-A-continued

Series C Compounds Formulations and Mixing Procedures

| Compound | C1 | C2 | C3 | C4 |
|---|---|---|---|---|
| Si-69 | 4.50 | 4.50 | 4.50 | 4.50 |
| Sundex 8125 | 25 | 25 | 25 | 25 |
| Zinc Oxide | 3.5 | 3.5 | 3.5 | 3.5 |
| Stearic Acid | 2 | 2 | 2 | 2 |
| Flexzone 7p | 1.5 | 1.5 | 1.5 | 1.5 |
| Sunproof Imp. | 1.5 | 1.5 | 1.5 | 1.5 |
| Durax | 1.5 | 1.5 | 1.5 | 1.5 |
| Vanax DPG | 1 | 1 | 1 | 1 |
| TMTD | 0.4 | 0.4 | 0.4 | 0.4 |
| Sulfur | 1.4 | 1.4 | 1.4 | 1.4 |
| Mixing | | | | |
| Mixing procedure | S3,FO | S1,FO | S3,FO | S1,FO |
| Mixing time (min.) | 13 | 13 | 13 | 13 |
| Total mixing stages | 3 | 3 | 3 | 3 |

TABLE V-A

Series D Compounds Formulations and Mixing Procedures

| Compound | D1 | D2 | D3 | D4 | D5 | D6 | D7 | D8 |
|---|---|---|---|---|---|---|---|---|
| FSSBR NS-116 | 75 | 15 | 75 | 75 | 75 | 75 | 75 | 75 |
| BR Taktene 1203 | 25 | 25 | 25 | 25 | 25 | 25 | 25 | 25 |
| CRX 2000 | 75 | 75 | 75 | 75 | 75 | 75 | 75 | |
| Silica Zeosil 1165 | | | | | | | | 15 |
| Si-69 | 4.50 | 4.50 | 3.40 | 2.25 | 1.13 | 0.00 | 2.25 | |
| X50S | | | | | | | | 12 |
| Sundex 8125 | 25 | 25 | 25 | 25 | 25 | 25 | 25 | 25 |
| Zinc Oxide | 3.5 | 3.5 | 3.5 | 3.5 | 3.5 | 3.5 | 3.5 | 3.5 |
| Stearic Acid | 2 | 2 | 2 | 2 | 2 | 2 | 2 | 2 |
| Flexzone 7p | 1.5 | 1.5 | 1.5 | 1.5 | 1.5 | 1.5 | 1.5 | 1.5 |
| Sunproof Imp. | 1.5 | 1.5 | 1.5 | 1.5 | 1.5 | 1.5 | 1.5 | 1.5 |
| Durax | 1.5 | 1.5 | 1.5 | 1.5 | 1.5 | 1.5 | 1.5 | 1.5 |
| Vanax DPG | 1 | 1 | 1 | 1 | 1 | 1 | 1 | 1 |
| TMTD | 0.4 | 0.4 | 0.4 | 0.4 | 0.4 | 0.4 | 0.4 | 0.4 |
| Sulfur | 1.4 | 1.4 | 1.4 | 1.4 | 1.4 | 1.4 | 1.4 | 1.4 |
| Mixing | | | | | | | | |
| Mixing procedure | Standard | S1,FO | S1,FO | S1,FO | S1,FO | S1,FO | S1,FO | S1,FO |
| Mixing time, min | 12 | 12 | 12 | 12 | 12 | 12 | 8 | 12 |
| Total mixing stage | 3 | 3 | 3 | 3 | 3 | 3 | 2 | 3 |

TABLE VI-A

Formulations

| Compound | E1 | E2 | E3 | E4 | E5 | E6 |
|---|---|---|---|---|---|---|
| SSBR Duradene 715 | 75 | 75 | 75 | 75 | 75 | 75 |
| BR Taktene 1203 | 25 | 25 | 25 | 25 | 25 | 25 |
| CRX 2000 | 75 | 75 | 75 | 75 | 75 | 75 |
| Si-69 | 4.50 | 4.50 | 3.40 | 2.25 | 1.13 | 0.00 |
| Sundex 8125 | 25 | 25 | 25 | 25 | 25 | 25 |
| Zinc Oxide | 3.5 | 3.5 | 3.5 | 3.5 | 3.5 | 3.5 |
| Stearic Acid | 2 | 2 | 2 | 2 | 2 | 2 |
| Flexzone 7p | 1.5 | 1.5 | 1.5 | 1.5 | 1.5 | 1.5 |
| Sunproof Imp. | 1.5 | 1.5 | 1.5 | 1.5 | 1.5 | 1.5 |
| Durax | 1.5 | 1.5 | 1.5 | 1.5 | 1.5 | 1.5 |
| Vanax DPG | 1 | 1 | 1 | 1 | 1 | 1 |
| TMTD | 0.4 | 0.4 | 0.4 | 0.4 | 0.4 | 0.4 |
| Sulfur | 1.4 | 1.4 | 1.4 | 1.4 | 1.4 | 1.4 |

TABLE VI-A-continued

| | Formulations | | | | | |
|---|---|---|---|---|---|---|
| Compound | E1 | E2 | E3 | E4 | E5 | E6 |
| Mixing | | | | | | |
| Mixing procedure | Standard | S1,FO | S1,FO | S1,FO | S1,FO | S1,FO |
| Mixing time, min | 8 | 12 | 12 | 12 | 12 | 12 |
| Total mixing stage | 3 | 3 | 3 | 3 | 3 | 3 |

The elastomer compositions prepared in accordance with the above mixing procedures were tested. Specifically, representative samples of the compositions were subjected to the following test procedures.

Test Methods for Compounds

Cure characteristics (Rheometer data)—ASTM D)-2084.

Mooney viscosity (measured for the pre-cured material)—ASTM D-1646.

Hardness—ASTM D-2240.

Modulus at recited percentage elongation—ASTM D-412.

Tensile strength (modules at break)—ASTM D-412.

Elongation at break—ASTM D-412.

Bound rubber—The bound rubber content of an elastomer composition incorporating filler was determined by extraction of the elastomer composition with toluene at room temperature.

Dynamic hysteresis (tan d)—was determined using a Rheometrics Dynamic Spectrometer II (RDS II, Rheometrics, Inc., N.J.) with strain sweep. The measurements were made at 0 and 70° C. with strain sweeps over a range of double strain amplitude (DSA from 0.2 to 120%). The maximum tan δ values on the strain sweep cures were taken for comparing the hysteresis among elastomer compositions.

Abrasion resistance was determined using an abrader, which is based on a Lambourn-type machine as described in U.S. Pat. No. 4,995,197, hereby incorporated by reference. The tests were carried out at 14% slip. The percentage slip is determined based on the relative velocities of a sample wheel and a grindstone wheel. The abrasion resistance index is calculated from the mass loss of the elastomer composition.

The test results for the compositions prepared in the examples above (identified by series number, e.g., "compound A1" etc.) are presented in the tables below. Abrasion values repeated in the tables below are normalized. That is, the abrasion value for the first example in each group of compounds reported is set at 100%. The abrasion results for all other examples in that group are referenced to the first compound of that group. It will be understood, therefore, that a higher abrasion valiue corresponds to higher abrasion resistance.

TABLE I-B

| Compound | A1 | A2 | A3 | A4 | A5 | A6 | A7 | A8 | A9 |
|---|---|---|---|---|---|---|---|---|---|
| Polymer[a] | FSSBR | FSSBR | FSSBR | SSBR | SSBR | SSBR | FSSBR | FSSBR | FSSBR |
| Carbon Black | N234 | N234 | N234 | N234 | N234 | N234 | CRX 2000 | CRX 2000 | CRX 2000 |
| Mixing procedure | Standard | S1 | 123% S1 | Standard | S1 | 123% S1 | Standard | S1 | 123% S1[b] |
| Rheometer data @ 145° C. | | | | | | | | | |
| Minimum torque, dN.m | 10.6 | 12.2 | 10.9 | 11.3 | 15.2 | 13.9 | 10.6 | 11.8 | 10.2 |
| Maximum torque, dN.m | 40.2 | 39.9 | 45.6 | 41.7 | 42.1 | 42.3 | 382 | 37.6 | 39.1 |
| $t_2$, min | 4.4 | 4.3 | 4.0 | 5.3 | 4.9 | 5.3 | 5.7 | 6.0 | 6.0 |
| $t_{90}$, min | 17.2 | 15.4 | 14.9 | 17.6 | 16.1 | 17.4 | 20.4 | 20.1 | 21.7 |
| Bound rubber, % | 36.9 | 49.0 | 43.2 | 40.4 | 62.9 | 512 | 34.1 | 48.3 | 41.4 |
| Hardness, A2 | 71 | 72 | 13 | 12.0 | 72.0 | 73.0 | 61 | 68 | 69 |
| 100% modulus, MPa | 2.8 | 2.7 | 3.1 | 2.8 | 3.2 | 3.2 | 2.2 | 2.1 | 2.4 |
| 200% modulus, MPa | 7.3 | 7.5 | 8.8 | 7.6 | 9.2 | 9.5 | 5.4 | 5.7 | 6.9 |
| 300% modulus, MPa | 13.7 | 14.3 | 16.1 | 14.6 | | | 10.7 | 11.8 | 13.5 |
| Tensile strength, MPa | 15.1 | 20.0 | 18.7 | 18.9 | 15.8 | 16.9 | 16.7 | 18.2 | 20.9 |
| Elongation at break, % | 332 | 385 | 338 | 361 | 278 | 287 | 402 | 399 | 412 |
| tan $\delta_{max}$, 0° C. | 0.623 | 0.658 | 0.652 | 0.444 | 0.464 | 0.454 | 0.720 | 0.689 | 0.641 |
| tan $\delta_{max}$, 70° C. | 0.158 | 0.132 | 0.122 | 0.156 | 0.140 | 0.132 | 0.128 | 0.109 | 0.106 |
| Abrasion index, %, 14% slip | 100 | 114 | 100 | 100 | 113 | 105 | 100 | 123 | 124 |
| Abrasion index, %, 21% slip | 100 | 108 | 112 | 100 | 118 | 126 | 100 | 112 | 113 |

TABLE II-B

| Compound | B1-A | B2-A | B3-A | B4-A | B5-A | B6-A |
|---|---|---|---|---|---|---|
| Polymer | SSBR/BR | SSBR/BR | FSSBR/BR | FSSBR/BR | ESBR/BR | ESBR/BR |
| Mixing procedure | Standard | S1 | Standard | S1 | Standard | S1 |
| Mixing time, min | 8 | 8 | 8 | 8 | 8 | 8 |
| Rheometer data at 145° C. | | | | | | |
| Minimum torque, dN.m | 8.3 | 9.9 | 6.7 | 7.8 | 6.8 | 7.2 |
| Maximum torque, dN.m | 34.5 | 33.8 | 27.6 | 31.1 | 25.9 | 27.6 |
| $t_2$, min | 11.4 | 10.1 | 12.1 | 7.5 | 11.3 | 7.9 |
| $t_{90}$, min | 20.8 | 20.8 | 21.6 | 16.4 | 23.8 | 20.8 |
| $ML_{1+4}$ @ 100° C. | 79 | 83 | 87 | 90 | 69 | 72 |
| Bound rubber, % | 41.0 | 48.7 | 37.9 | 42.6 | 37.5 | 42.1 |
| Hardness, A2 | 70 | 70 | 74 | 72 | 69 | 70 |
| 100% modulus, MPa | 2.2 | 2.3 | 2.4 | 2.5 | 1.7 | 2.1 |
| 200% modulus, MPa | 5.1 | 5.7 | 5.6 | 5.9 | 3.7 | 5.0 |
| 300% modulus, MPa | 9.2 | 10.3 | 9.6 | 10.3 | 13.8 | 9.3 |
| Tensile strength, MPa | 17.8 | 18.1 | 10.8 | 18.1 | 12.7 | 17.4 |
| Elongation at break, % | 547 | 502 | 329 | 514 | 475 | 523 |
| tan $\delta_{max}$, 0° C. | 0.473 | 0.464 | 0.532 | 0.521 | 0.430 | 0.411 |
| tan $\delta_{max}$, 70° C. | 0.292 | 0.284 | 0.298 | 0.270 | 0.346 | 0.299 |
| Abrasion index, %, 14% slip | 100 | 108 | 100 | 102 | 100 | 123 |
| Abrasion index, %, 21% slip | 100 | 113 | 100 | 131 | 100 | 118 |

TABLE III-B

| Compound | B1-B | B2-B | B3-B | B4-B | B5-B | B6-B |
|---|---|---|---|---|---|---|
| Polymer | SSBR/BR | SSBR/BR | FSSBR/BR | FSSBR/BR | ESBR/BR | ESBR/BR |
| Mixing procedure | S3,FO | S1,FO | S3,FO | S1,FO | S3,FO | S1,FO |
| Mixing time, min | 12 | 12 | 12 | 12 | 12 | 12 |
| Rheometer data at 145° C. | | | | | | |
| Minimum torque, dN.m | 9.5 | 11.3 | 7.7 | 8.1 | 7.0 | 7.1 |
| Maximum torque, dN.m | 28.4 | 30.8 | 28.1 | 28.5 | 26.6 | 27.1 |
| $t_2$, min | 11.8 | 7.8 | 12.1 | 8.1 | 10.4 | 6.8 |
| $t_{90}$, min | 20.1 | 17.3 | 21.5 | 17.3 | 22.8 | 19.9 |
| $ML_{1+4}$ @ 100° C. | 70 | 89 | 82 | 85 | 65 | 71 |
| Bound rubber, % | 45.3 | 62.0 | 46.6 | 57.2 | 43.6 | 50.1 |
| Hardness, A2 | 69 | 69 | 71 | 69 | 70 | 69 |
| 100% modulus, MPa | 2.3 | 2.4 | 2.4 | 2.7 | 2.0 | 2.0 |
| 200% modulus, MPa | 6.1 | 6.6 | 5.9 | 7.2 | 4.8 | 5.3 |
| 300% modulus, MPa | 11.3 | 12.3 | 10.8 | 13.0 | 9.5 | 10.4 |
| Tensile strength, MPa | 17.2 | 17.5 | 15.9 | 20.4 | 16.9 | 18.5 |
| Elongation at break, % | 434 | 407 | 423 | 467 | 481 | 492 |
| tan $\delta_{max}$, 0° C. | 0.454 | 0.412 | 0.524 | 0.485 | 0.405 | 0.403 |
| tan $\delta_{max}$, 70° C. | 0.243 | 0.226 | 0.279 | 0.231 | 0.272 | 0.251 |
| Abrasion index, %, 14% slip | 100 | 125 | 100 | 114 | 100 | 103 |
| Abrasion index, %, 21% slip | 100 | 161 | 100 | 127 | 100 | 112 |

50

TABLE IV-B

| Compound | C1 | C2 | C3 | CA |
|---|---|---|---|---|
| Polymer | SSBR/BR | SSBR/BR | FSSBR/BR | FSSBR/BR |
| Mixing procedure | S3,1FO | S1,FO | S3,FO | S1,FO |
| Mixing time, min | 13 | 13 | 13 | 13 |
| Rheometer data at 145° C. | | | | |
| Minimum torque, dN.m | 14.6 | 14.5 | 11.8 | 11.9 |
| Maximum torque, dN.m | 34.5 | 36.0 | 31.6 | 32.7 |
| $t_2$, min | 2.7 | 2.6 | 4.3 | 3.2 |
| $t_{90}$, min | 12.2 | 12.5 | 11.0 | 7.5 |
| $ML_{1+4}$ @ 100° C. | 80.0 | 95.0 | 85.0 | 89.0 |

TABLE IV-B-continued

| Compound | C1 | C2 | C3 | CA |
|---|---|---|---|---|
| Polymer | SSBR/BR | SSBR/BR | FSSBR/BR | FSSBR/BR |
| Mixing procedure | S3,1FO | S1,FO | S3,FO | S1,FO |
| Mixing time, min | 13 | 13 | 13 | 13 |
| Bound rubber, % | 75.4 | 81.0 | 62.3 | 68.5 |
| Hardness, A2 | 71 | 72 | 68 | 68 |
| 100% modulus, MPa | 3.0 | 2.9 | 2.1 | 2.5 |
| 200% modulus, MPa | 8.7 | 9.7 | 4.5 | 7.3 |
| 300% modulus, MPa | 15.6 | | 8.3 | 13.7 |
| Tensile strength, MPa | 17.6 | 17.5 | 16.1 | 17.9 |
| Elongation at break, % | 325 | 291 | 488 | 372 |
| tan $\delta_{max}$, 0° C. | 0.366 | 0.371 | 0.438 | 0.440 |
| tan $\delta_{max}$, 70° C. | 0.134 | 0.121 | 0.125 | 0.102 |
| Abrasion index, %, 14% slip | 100 | 95 | 100 | 100 |
| Abrasion index, %, 21% slip | 100 | 111 | 100 | 98 |

TABLE V-B

| Compound | D1 | D2 | D3 | D4 | D5 | D6 | D7 |
|---|---|---|---|---|---|---|---|
| Filler | CRX 2000 | CRX 2000 | CRX 2000 | CRX 2000 | CRX 2000 | CRX 2000 | CRX 2000 |
| Mixing procedure | Standard | S1,FO | S1,FO | S1,FO | S1,FO | S1,FO | S1,FO |
| Mixing time, min | 12 | 12 | 12 | 12 | 12 | 12 | 8[a] |
| Si 69, phr | 4.50 | 4.50 | 3.40 | 2.25 | 1.13 | 0.00 | 2.25 |
| Rheometer data at 145° C. | | | | | | | |
| Minimum torque, dN.m | 9.5 | 10.5 | 10.4 | 11.3 | 1.7 | 9.9 | 10.7 |
| Maximum torque, dN.m | 32.0 | 35.7 | 37.9 | 38.4 | 37.6 | 34.9 | 38.4 |
| $t_2$, min | 4.2 | 2.4 | 2.3 | 2.3 | 2.8 | 3.3 | 2.3 |
| $t_{90}$, min | 18.8 | 14.7 | 11.7 | 9.4 | 9.8 | 8.7 | 9.28 |
| $ML_{1+4}$ @ 100° C. | 72.0 | 83.0 | 85.0 | 91.0 | 91.0 | 82.0 | 85 |
| Bound rubber, % | 68.3 | 75.9 | 76.0 | 81.1 | 77.9 | 60.0 | 69.6 |
| Hardness, A2 | 63 | 69 | 71 | 70 | 70 | 67 | 71 |
| 100% modulus, MPa | 1.8 | 3.2 | 4.0 | 2.4 | 3.4 | 1.7 | 2.98 |
| 200% modulus, MPa | 3.9 | 10.2 | 12.3 | 9.6 | 10.5 | 5.9 | 9.83 |
| 300% modulus, MPa | 7.8 | 18.0 | | | 18.4 | 12.2 | |
| Tensile strength, MPa | 18.3 | 18.7 | 18.6 | 15.1 | 20.4 | 11.9 | 13.52 |
| Elongation at break, % | 540 | 311 | 274 | 261 | 331 | 410 | 251 |
| tan $\delta_{max}$, 0° C. | 0.460 | 0.422 | 0.446 | 0.450 | 0.439 | 0.473 | 0.457 |
| tan $\delta_{max}$, 70° C. | 0.165 | 0.127 | 0.132 | 0.129 | 0.132 | 0.165 | 0.138 |
| Abrasion index, %, 14% slip | 100 | 132 | 139 | 139 | 138 | 94 | 114 |
| Abrasion index, %, 21% slip | 100 | 137 | 172 | 231 | 188 | 88 | 121 |

[a]note: Two-stage mixing

TABLE VI-B

| Compound | E1 | E2 | E3 | E4 | E5 | E6 |
|---|---|---|---|---|---|---|
| Carbon black | CRX 2000 | CRX 2000 | CRX 2000 | CRX 2000 | CRX 2000 | CRX 2000 |
| Mixing procedure | Standard | S1,FO | S1,FO | S1,FO | S1,FO | S1,FO |
| Mixing time, min | 8 | 12 | 12 | 12 | 12 | 12 |
| Si 69, phr | 4.50 | 4.50 | 3.40 | 2.25 | 1.13 | 0 |
| Rheometer data at 145° C. | | | | | | |
| Minimum torque, dN.m | 5.8 | 6.9 | 92 | 10.1 | 9.9 | 9.4 |
| Maximum torque, dN.m | 32.5 | 31.1 | 31.8 | 32.2 | 30.3 | 28.6 |
| $t_2$, min | 2.55 | 2.46 | 2.6 | 2.8 | 3.3 | 4.47 |
| $t_{90}$, min | 13.24 | 13.61 | 12.5 | 9.13 | 8.94 | 12.02 |
| $ML_{1+4}$ @ 100° C. | 62 | 71 | 103 | 107 | 114 | 89 |
| Bound rubber, % | 50.7 | 63.4 | 76.8 | 78.5 | 79.9 | 64.2 |
| Hardness, A2 | 72 | 68 | 71 | 70 | 68 | 66 |
| 100% modulus, MPa | 2.79 | 2.74 | 3.16 | 3.55 | 2.94 | 2.15 |

TABLE VI-B-continued

| Compound | E1 | E2 | E3 | E4 | E5 | E6 |
| --- | --- | --- | --- | --- | --- | --- |
| Carbon black | CRX 2000 | CRX 2000 | CRX 2000 | CRX 2000 | CRX 2000 | CRX 2000 |
| Mixing procedure | Standard | S1,FO | S1,FO | S1,FO | S1,FO | S1,FO |
| Mixing time, min | 8 | 12 | 12 | 12 | 12 | 12 |
| Si 69, phr | 4.50 | 4.50 | 3.40 | 2.25 | 1.13 | 0 |
| 200% modulus, MPa | 7.86 | 8.58 | 11.82 | 10.92 | 9.31 | 6.17 |
| 300% modulus, MPa | 14.21 | 16.24 | | | 17.38 | 12.17 |
| Tensile strength, MPa | 16.91 | 17.99 | 18.57 | 17.16 | 19.52 | 19.05 |
| Elongation at break, % | 346 | 326 | 274 | 273 | 330 | 426 |
| tan $\delta_{max}$, 0° C. | 0.402 | 0.348 | 0.353 | 0.355 | 0.359 | 0.371 |
| tan $\delta_{max}$, 70° C. | 0.182 | 0.135 | 0.142 | 0.142 | 0.141 | 0.19 |
| Abrasion index, %, 14% slip | 100 | 122 | 145 | 138 | 130 | 108 |
| Abrasion index, %, 21% slip | 100 | 121 | 160 | 149 | 117 | 76 |

The foregoing test results shown in Table I-B through Table VI-B demonstrate the significant improvements achieved in various important performance characteristics for the example compounds embodying the invention disclosed above. In Table I-B, the values measured for tan $\delta_{max}$ at 70° C. show excellent results for embodiments of the present invention, and in some respects significant improvement over comparable prior art. Examples A2 and A3, wherein sulfuir crosslinking agent was added during the first stages, have advantageously lower tan $\delta_{max}$ values than that of Example A1, wherein sulfur was added only in the last stage (in accordance with prior art techniques) along with accelerations, etc., as part of a vulcanization system. Similarly, the tan $\delta_{max}$ values for Examples A5 and A6 are lower than that of Examples A4. The tan $\delta_{max}$ values for Examples A8 and A9 (employing silicon-treated carbon black filler) are advantageously lower than that of Example A7 which, again, is comparable to Examples A8 and A9 except for the late stage versus early stage addition of sulfur. Highly advantageous abrasion resistance results are shown for the embodiment of the present invention. The abrasion index values for Example A2 at both 14% slip and 21% slip are significantly better than those values for the comparable Example A1. The invention embodiment of Example A3 also has excellent abrasion resistance, being equal to that of Example A1 at 14% slip and substantially better at 21% slip. Similarly, each of Examples A5 and A6 is significantly better than comparable Example A4 at both 14% slip and 21% slip. Likewise, significant improvement in abrasion resistance at both 14% slip and 21% slip is shown for Examples A8 and A9 versus comparable Example A7. Other material properties and performance characteristics shown in Table I-B for the embodiments of the present invention involving early stage sulfur addition also are seen to have good values.

In Table II-B, significantly improved tan $\delta_{max}$ 70° C. values are shown for the early stage sulfur addition examples (B2-A, B4-A and B6-A) over that of the comparable example with only late-stage sulfur addition (B1-A, B3-A and B5-A, respectively). Also, the abrasion resistance of each is seen to be significantly improved. Thus, the abrasion resistance of Example B2-A is better than that of Example B13-A at both 14% slip and 21% slip. The abrasion resistance of Example B4-A is better than that of Example B3-A at both 14% slip and 21% slip. The abrasion resistance of Example B6-A is better than that of Example B5-A at both 14% slip and 21% slip.

Even greater improvement is seen for examples embodying the present invention, wherein the sulfur crosslinking agent and filler were added and at least substantially dispersed while the elastomer was still oil-free in the early stage. Thus, in Table III-B the abrasion resistance of Example B2-B (having early stage, oil free sulfur addition) is seen to far exceed that of comparable Example B1-B (having only late-stage sulfur addition). Likewise, the abrasion value for early stage oil-free sulfur addition Example B4-B are significantly improved over comparable late stage sulfur addition Example B3-B. Similarly, the abrasion resistance of Example B6-B is better than that of Example B5-B. Excellent tan $\delta_{max}$ 70° C. values also are shown for the early stage, oil-free sulfur addition examples B2-B, B4-B and B6-B. Notable in this regard, the tan $\delta_{max}$ 70° C. value for Example B4-B is 0.231, far lower than the tan $\delta_{max}$ 70° C. value of 0.279 for comparable Example B3-B.

Similar improvement is shown in Table IV-B for invention embodiments C2 and C4 over comparable late stage sulfur addition examples C1 and C3, respectively. All of the C-series examples Oust as the B-B-series examples) added and at least substantially dispersed the filler oil-free. For Example C2 having early stage sulfur addition, advantageously lower tan $\delta_{max}$ 70° value and advantageously higher abrasion resistance at 21% slip are shown over Example C1 having only late stage sulfur addition. Similarly, lower tan $\delta_{max}$ 70° C. and comparable abrasion resistance are shown for Example C4 compared to Example C3.

Test results for the D-series examples are shown in Table V-B. The D-Series examples employ silicon-modified carbon black filler and the costly additive Si-69 (discussed above). Example D1 was a standard three stage mixing procedure employing 4.50 phr Si-69. Examples D2 through D7 all employed early stage, oil-free addition of filler and sulfur crosslinking agent in accordance with preferred embodiments of the present invention. Example D2 which used the same 4.50 phr Si-69 as in Example D1 is seen to have a much lower tan $\delta_{max}$, 70° C. value than Example D1 and also significantly improved abrasion resistance at both 4% slip and 21% slip. In Example D3 through D5, the amount of costly Si-69 is progressively reduced, yet advantageously improved tan $\delta_{max}$ 70° C. values and abrasion resistance values are still achieved over Example D1. Even with no Si-69, Example D6 demonstrates that good tan $\delta_{max}$ 70° C. and abrasion resistance can be achieved by the early stage, oil free addition of sulfur and filler preblend in accordance with preferred embodiments of the present invention. Even using reduced Si-69 (2.25 phr) and only two mixing stages rather than three, Example D7 shows that good tan $\delta_{max}$ 70° value can be achieved by the invention along with abrasion resistance significantly improved over that of Example D1.

Figure 2:
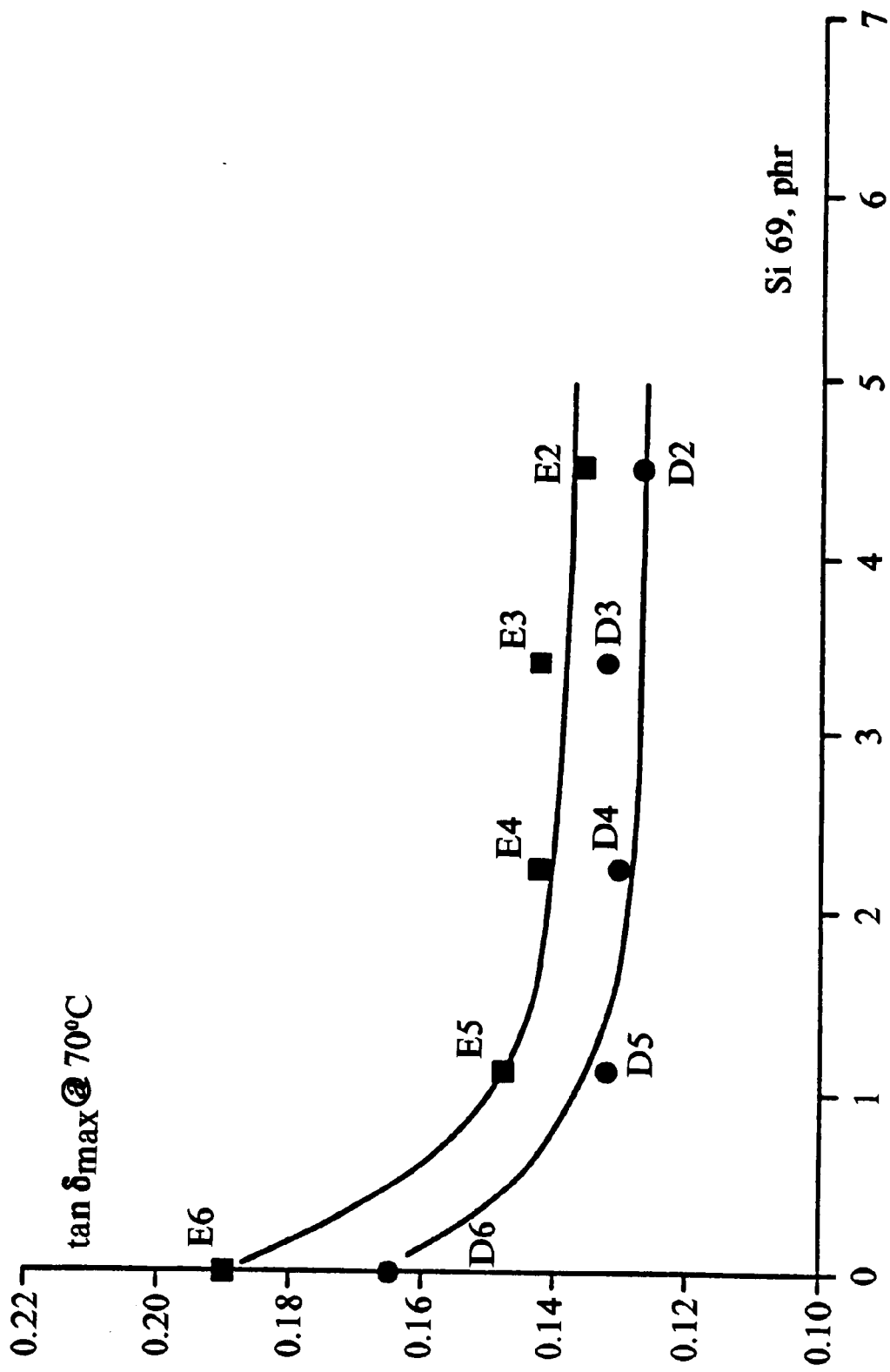
FIG. 2 is a graph showing improved vulcanizate hysteresis properties achieved by the present invention, even at reduced levels of costly coupling agent widely used to enhance this performance characteristic.

Results similar to those of the D-series examples were achieved for the E-series examples, as shown in Table VI-B. Whereas the D-series examples used NS116 elastomer, the E-series examples used Duradene 715 and butyl rubber. Thus, compared to Example E1, excellent improvement in abrasion resistance and tan $\delta_{max}$ 70° values are shown for Example E2 through E6 notwithstanding the progressively reduced amounts of the costly additive Si-69. The excellent tan $\delta_{max}$ 70° values for the early stage, oil-free addition examples E2 through E6 and D2 through D6 are shown as a function of Si-69 usage in the graph of FIG. 2. It can be seen in FIG. 2 that advantageously low usage levels of Si-69 provide approximately maximum benefit in tan $\delta_{max}$ 70° C. value for preferred embodiment of the present invention employing silicon-modified carbon black filler.

As noted above in reference to the test results shown in Table I-B, the test results shown in Table I-B, the test results shown in Table II-B through VI-B, in addition to the excellent tan $\delta_{max}$ 70° and abrasion resistance values, demonstrate good material properties and performance characteristics for the materials produced in accordance with the examples having early stage sulfur addition, including those having oil-free early stage addition.

Novel Elastomer Compositions

While any suitable filler can be used in the multi-stage process of the invention described in detail above, the novel product aspects now described achieves significant unexpected results employing certain preferred fillers. The preferred fillers include the metal-treated carbon blacks described above. The significant unexpected results include increased bound rubber and/or improved abrasion resistance. These novel elastomer compositions of the present invention comprise unsaturated elastomer, treated carbon black (as described above) and a pre-vulcanization modifier reactive as a crosslinking agent with the elastomer. The pre-vulcanization modifier is present in the elastomer composition in an amount effective to substantially increase bound rubber content in a substantially unvulcanized, processable elastomer product of a non-productive thermomechanical working of the elastomer composition.

The loading level of treated carbon black in the elastomer composition will depend on the specific materials selected for use and on the performance properties desired in the intended application. It will be within the ability of those skilled in the art, given the benefit of the present disclosure, to select suitable loading levels for a given application. Generally, for tire tread applications, for example, 25 to 120 phr filler will be suitable, more preferably 35 to 90 phr filler. Other suitable fillers may be used in conjunction with the treated carbon black particulate filler, such as various grades of carbon black suitable to the intended application of the composition. Silica also may be used instead of, or in conjunction with, carbon black as a co-filler along with the treated carbon black. Preferably, such co-filler is a minor portion of the total filler content of the composition.

Preferred pre-vulcanization modifiers for the elastomer compositions disclosed here include non-silane polysulfidic organo-compounds effective to substantially increase bound rubber content in a unvulcanized masterbatch composition. More specifically, upon thermomechanical working of an elastomer composition comprising the treated carbon black particulate filler and the pre-vulcanization modifier with unsaturated elastomer, a unvulcanized masterbatch composition is produced in which the bound rubber content is substantially increased over the amount of bound rubber which would result from such thermomechanical working of the same composition without the pre-vulcanization modifier. As used in this context, the bound rubber content of such a resulting masterbatch is substantially increased, meaning preferably at least 10%, more preferably 15% to 30% more bound rubber by weight than would be achieved in the corresponding elastomer composition lacking the pre-vulcanization modifier. In accordance with an alternative measurement, the elastomer composition comprising the pre-vulcanization modifier disclosed here has preferably at least 55 wt. % bound rubber, more preferably at least 80 wt. % bound rubber content.

Suitable pre-vulcanization modifiers are commercially available, including non-silane arylphenol polysulfides and non-silane alkylphenol polysulfides, where the alkyl groups and/or aryl groups are selected independently of each other from C1 to C10 moieties, that is, from alkyl and aryl groups containing from 1 to 10 carbons, preferably C3 to C5, more preferably C4. Suitable non-silane alkylphenol polysulfides include, for example tertiary butyl-phenol polysulfide which is commercially available as Rylex 30 from Ferro Corporation, Bedord Chemical, Walton Hills, Ohio, USA. Other suitable pre-vulcanization modifiers include, for example, dithiodimorpholine (DTDM) and dicaprolactam disulfide (DCDS). It will be recognized that some such materials, including, for example, Rylex 30, DTDM and DCDS, have heretofore been known as one component of a multi-part vulcanizing system, typically along with an accelerating agent such as a sulfonamide. Use as a pre-vulcanization modifier for a composition comprising silicon-treated carbon black or other treated carbon black, however, has not heretofore been recognized. Suitability for use in an elastomer composition in accordance with the disclosure here contemplates that an effective accelerator is excluded from the initial masterbatch, such that the thermomechanical working of the masterbatch at a vulcanization temperature will be non-productive. That is, thermomechanical working of the composition at a temperature which would be sufficient to vulcanize the elastomer in the presence of a vulcanizing system is achieved as a non-productive step by exclusion of such accelerator and/or other components of an effective vulcanization system for the elastomer and pre-vulcanization modifier employed. The amount of pre-vulcanization modifier used in the base composition will impact results achieved in the intermediate and final elastomer products. It will be within the ability of those skilled in the art, given the benefit of the present disclosure, to determine suitable usage levels based on the particular materials chosen, the intended processing parameters and the intended results.

In accordance with preferred embodiments, the elastomer composition typically comprises from 0.5 wt. % to 10.0 wt. % pre-vulcanization modifier, more preferably 2.0 wt. % to 6.0 wt. %. The precise amount of pre-vulcanization modifier suitable for a given elastomer composition will depend to an extent on the choice of materials, the intensity and duration of the thermomechanical working step and the performance characteristics and morphology desired in the product. The last mentioned factor will depend, of course, in some measure on the intended application of the product, and the preferred ranges stated here are especially applicable to elastomer compositions intended for tire tread applications. In general, in a masterbatch composition intended for use in preparing a tire tread elastomer composition, having about 30 to 120 phr silicon-treated carbon black and employing natural rubber, SBR or the like, a pre-vulcanization modifier consisting primarily of Rylex 30, DTDM and/or DCDS or the like, will be used in an amount of about 0.5 to 10.0 phr, more preferably to 6 phr. Highly preferred pre-vulcanization modifiers are the non-silane polysulfidic organo-compounds exhibiting preventive anti-oxidant properties in organic polymer systems, including tertiary butyl-phenol polysulfide. Suitable alternative pre-vulcanization modifiers are commercially available or readily prepared, and will be apparent to those skilled in the art. along with their suitable usage levels, given the benefit of the present disclosure. The pre-vulcanization modifier can be provided in the form of a filler pre-mix comprising the above-described treated carbon black in substantially homogeneous admixture with the pre-vulcanization modifier. Alternatively, the treated carbon black filler and the pre-vulcanization modifier can be separately or individually admixed with the unsaturated elaistomer either prior to or during thermomechanical working to prepare a masterbatch.

A masterbatch comprising pre-vulcanization modifier, treated carbon black filler and unsaturated elastomer can be thermomechanically worked using known equipment and techniques. Typically, for example, mechanical working in a suitable mixer, such as an internal mixer or extruder will be carried out for a suitable period of time, generally having a duration of 10 seconds to 20 minutes, and reaching a maximum temperature between 130° C. and 180° C. It will be understood that the precise processing parameters will depend in part on the performance characteristics of the mixing apparatus, the filler loading level, as well as the performance characteristics and morphology desired in the resultant masterbatch. In general, the thermomechanical working should achieve an excellent pre-dispersing of the filler and reactive intermixing of the pre-vulcanization modifier agent. The thermomechanical working can be accomplished in a single thermal step of suitable duration, temperature and intensity, or it can comprise several thermal steps separated by cooling of the composition. A suitable multi-step thermomechanical working process can be employed, such as described above. It will be within the ability of those skilled in the art, given the benefit of the present disclosure, to determine suitable thermomechanical mixing parameters for a given application. It is significant in this regard that this is a non-productive thermomechanical working. A suitable vulcanization system can be added to the masterbatch such that it can be vulcanized in accordance with known materials and techniques. In accordance with preferred embodiments, however, known multi-part vulcanization systems are excluded frorri the initial masterbatch. Thus, the initial masterbatch is processable and substantially unvulcanized. Preferably, the substantially unvulcanized, processable elastomer composition has a Mooney viscosity less than 150 mu at 100° C. (ML) measured in accordance with ASTM 1646. Thus, the initial masterbatch in these embodiments in free of accelerator for the pre-vulcanization modifier.

In accordance with certain preferred embodiment, vulcanizable compositions are provided comprising the aforesaid unvulcanized masterbatch admixed together with a vulcanization system effective to vulcanize the masterbatch at a suitable vulcanization temperature. In general, the resulting "final mix" can be vulcanized in accordance with known techniques using commercially known vulcanization systems suited to the choice of unsaturated elastomer(s) in the composition. In that regard, it should be recognized that some portion of the pre-vulcanization modifier may be present in its original chemical state in the unvulcanized composition and even in subsequent intermediate and final elastomer products. Typically, however, the final mix and subsequent products contain primarily reaction product of the pre-vulcanization modifier with the other constituents of the composition.

The compositions disclosed here may be further compounded with one or more coupling agents to further enhance the properties of the resultant elastomer composition. Useful coupling agents include, for example, silane coupling agents such as bis(3-triethoxysilylpropyl) tetrasulfane (Si-69) and 3-thiocyanatopropyl-triethoxy silane (Si-264), both available from Degussa AG, Germany. Also suitable are vinyltriethoxysilane (Silquest® A151), methacryloxypropyltrimethoxysilane (A174) and vinyl-tris-(2-methoxysilane) (A172), all available from OSi Specialties Corporation, Tarrytown, N.J., USA, suitable mixtures of any of the aforesaid coupling agents also may be used. The coupling agents may be provided as a mixture with a suitable carrier, for example X50-S which is a mixture of Si-69 and N330 carbon black, available from Degussa AG.

The treated carbon black, such as silicon-treated carbon black, incorporated in the elastomer composition of the present invention may be oxidized. Suitable oxidizing agents include, but are not limited to, nitric acid and ozone as described in more detail above. Coupling agents which may be used with the oxidized silicon-treated fillers include, but are not limited to, the coupling agents set forth above.

The silicon-treated carbon blacks also may have an organic group attached, as described in more detail above, for example, as disclosed in the U.S. patent application Ser. No. 356,459, filed Dec. 15, 1994 and entitled "EPDM, HNBR and Butyl Rubber Compositions Containing Carbon Black Products", hereby incorporated by reference herein. Preferred organic groups include aromatic sulfides, represented by the formulas Ar—$S_n$—Ar' or Ar—$S_n$—Ar", wherein Ar and Ar' are independently arylene groups, Ar" is an aryl and n is 1 to 8. Another set of organic groups which may be attached to the treated carbon black fillers in accordance with preferred embodiments are organic groups substituted with an ionic or an ionizable group as a functional group, as disclosed, for example, in U.S. patent application Ser. No. 356,660, filed Dec. 15, 1994 and entitled "Reaction of Carbon Black with Diazonium Salts, Resultant Carbon Black Products and Their Uses", the entire disclosure of which is hereby incorporated herein by reference.

The elastomer compositions of the present invention may be prepared with any suitable unsaturated elastomer, including those set forth above in the discussion of the novel multi-stage methods of the invention. Preferred elastomers include, but are not limited to, homo- or co-polymers of 1,3-butadiene, styrene, isoprene, isobutylene, 2,3-dimethyl-1,3-butadiene, acrylonitrile, ethylene, and propylene. Preferably, the elastomer has a glass transition temperature (Tg) as measured by differential scanning colorimetry (DSC) ranging from about −120° C. to about 0° C. Examples include, but are not limited to, styrene-butadiene including SBR, natural rubber, polybutadiene, and polyisoprene. Suitable elastomers also include vinyl terminated materials such as vinyl-based silanes, and other elastomers which are peroxide curable. Blends of any of the foregoing may also be used. Preferably the elastomer is sulfur-curable, such as sulfur-vulcanizable elastomer selected from the group consisting of solution SBR, nature rubber, functional solution SBR, emulsion SBR, polybutadiene, polyisoprene and mixtures of any of them.

As noted above, in accordance with one aspect of the present disclosure, the elastomer composition may be a vulcanizable final mix formed by first preparing masterbatch via non-productive thermomechanical Working in accordance with the principles discussed above, and thereafter performing a finishing step in which a suitable vulcanization system, preferably a sulfur donor vulcanization system, is added to the masterbatch. The vulcanization system is selected to be effective to vulcanize the masterbatch by thermomechanical working at a suitable vulcanization temperature. The vulcanization system may comprise, for example, sulfur clonors, activators, accelerators, peroxides and/or other systems used to effect vulcanization of known elastomer compositions. The thermomechanical working of the aforesaid finishing step is carried out at a temperature below the vulcanization temperature to achieve good dispersion. Thereafter, a vulcanized elastomer composition can be prepared by thermomechanically working the product of the finishing step at a vulcanization temperature. The resultant elastomer compositions contain the treated carbon black particulate filler dispersed in the vulcanized elastomer with the reaction product of the pre-vulcanization modifier. Such vulcanized compositions may be used for various elastomner products, such as vehicle tire tread, industrial rubber products, seals, timing belts, pow,er transmission belting and the like, and other rubber goods. When utilized in tires, the elastomer compositions disclosed here also may be used for other tire components, for example, the carcass or sidewall.

It will be understood by those skilled in the art, given the benefit of the present disclosure, that the compositions disclosed here may further comprise any of various commonly used additive materials. Processing additives, for example, such as oils, resins, including tacifying resins, plasticizers, pigments, fatty acid, zinc oxide, waxes, antioxidants and anti-ozonants, peptizing agents, etc., may be employed in accordance with known techniques at appropriate points during processing. In this regard, in accordance with a significant feature of certain preferred embodiments, sulfur is added to the base composition. That is, sulfur is added to be present in the non-productive thermomechanical working of the base composition. In accordance with one highly preferred embodiment, the unsaturated elastomer is SBR, most preferably has approximately 12% to 90%, preferably 50% of the butadiene mers incorporated at the 1,2-position along the polymer chain (i.e., vinyl), and sulfur is added in the first stage, that is, in the non-productive working of the base composition. Sulfur preferably is added in an amount less than 10 phr, such that the thermomechanical working remains non-productive, notwithstanding that the working temperature reaches or exceeds the vulcanization temperature. Without wishing to be bound by theory, it can be surmised that free crosslinks are being advantageously added to the elastomer compositions comprising treated carbon black filler. An observed viscosity increase may be preventing or reducing reagglomeration with resultant low hystericis at high temperature. Good distribution of the filler along the elastomer chain, which is then preserved through curing, with higher polymer viscosity, may explain the improved hysterisis balance. Notably, comparable results are not achieved in this way with standard carbon black in place of the treated carbon black filler employed in the novel compositions of the present invention. In accordance with the principles discussed above, such optional addition of sulfur to the initial masterbatch is done with exclusion of sulfur activators or accelerators or the like to preserve the non-productive nature of the preliminary thermomechanical working of the base composition.

Irrespective of the underlying mechanism, it is highly significant that the vulcanized elastomer compositions provided here in accordance with preferred embodiments, are found to have significantly improved dynamic hysterisis characteristics. Most notably, improved hysterisis balance is achieved, wherein excellent wet-traction properties are achieved in conjunction with excellent rolling resistance performance characteristics. Preferred embodiments illustrating these advantageous results are further disclosed in the following examples. These examples are intended as illustrations and not as limitations upon the scope of the invention.

EXAMPLES

Examples 1–9

In these examples, the pre-vulcanization modifier (PVM) para-tertiarybutyl phenol polysulfide (APPS), was evaluated as an alternative to a commonly used silica coupling agent, bis-(3-triethoxysilylpropyl) tetrasulfane (TESPT) in a solution polymerized styrene-co-butadiene elastomer filled with either carbon black, a silica-modified carbon black or a silica filler. The elastomer compositions are shown in Table VII. The compositions were prepared in a 390 cc internal mixer using 3 separate stages. The pre-vulcanization modifier, APPS, was mixed with the filler and SBR elastomer in an internal mixer and subjected to thermomechanical working in a non-productive step wherein the batch was released at 160° C.+/−5° C. A second non-productive step, also released at 160° C., was then performed wherein the product of first non-productive step was returned to the mixer and process oil, antidegradents and activator systems were incorporated. The final productive stage involved addition of vulcanization system into the product of the second stage. In this third stage, the batch was released 1rom the mixer at a temperature less than 120° C., so that the composition remains workable.

Nine samples were prepared. In the order shown in Table VII below (from left to right), the first three samples all had 50 phr Vulcan 7H carbon black filler (commercially available from Cabot Corporation (Vulcan is a registered trademark of Cabot Corporation). As seen in Table VII, the first sample F1 had neither the pre-vulcanization modified nor the coupling agent. The second sample F1CA had the coupling agent TESPT. The third sample had the pre-vulcanization modifier APPS. The next three samples all had 50 phr silicon-modified carbon black Si-CB prepared in the manner described below in Example 10. Sample F2 had neither the coupling agent nor the pre-vulcanization modifier. Sample F2CA had the coupling agent TESPT. Sample F2PVM had the pre-vulcanization modifier APPS. The final three samples all had 55 phr Silica RP 1165 silica filler (commercially available from Rhone-Poulanc, France). Sample F3 had neither the coupling agent nor the pre-vulcanization modifier. Sample F3CA had the coupling agent TESPT. Sample F3PVM had the pre-vulcanization modifier APPS. The amount of coupling agent used was selected based on recommended optimum amounts. Specifically, for sample F1CA with carbon black filler, the 1.50 phr amount was selected based on S. Wolff and U. Gorl, Kautshuk & Gummi Kunstsoffe, 10/91, p. 941–947. For sample F2CA with silica filler, the 3.0 phr amount was selected based on teachings in U.S. Pat. No. 5,227,425 to Rauline. For each filler, the PVM level was selected to yield the same sulfur level as the corresponding sample with TESPT. (TESPT is 22 wt. % sulfur while APPS is 30 wt % sulfur.)

TABLE VII

|  | F1 | F1CA | F1PVM | F2 | F2CA | F2PVM | F3 | F3CA | F3PVM |
| --- | --- | --- | --- | --- | --- | --- | --- | --- | --- |
| SSBR[1] | 100 | 100 | 100 | 100 | 100 | 100 | 100 | 100 | 100 |
| VULCAN 7H[2] | 50 | 50 | 50 | — | — | — | — | — | — |
| Silica RP 1165[3] | — | — | — | — | — | — | 55 | 55 | 55 |
| Si-CB[4] | — | — | — | 50 | 50 | 50 | — | — | — |
| TESPT | — | 1.50 | — | — | 3.00 | — | — | 4.40 | — |
| APPS | — | — | 1.12 | — | — | 2.24 | — | — | 3.28 |
| Aromatic Oil | 5.00 | 5.00 | 5.00 | 5.00 | 5.00 | 5.00 | 5.00 | 5.00 | 5.00 |
| Zinc Oxide | 4 | 4 | 4 | 4 | 4 | 4 | 4 | 4 | 4 |
| Stearic Acid | 2 | 2 | 2 | 2 | 2 | 2 | 2 | 2 | 2 |

TABLE VII-continued

|  | F1 | F1CA | F1PVM | F2 | F2CA | F2PVM | F3 | F3CA | F3PVM |
|---|---|---|---|---|---|---|---|---|---|
| 6PPD | 1.5 | 1.5 | 1.5 | 1.5 | 1.5 | 1.5 | 1.5 | 1.5 | 1.5 |
| Wax | 1.5 | 1.5 | 1.5 | 1.5 | 1.5 | 1.5 | 1.5 | 1.5 | 1.5 |
| Curatives |  |  |  |  |  |  |  |  |  |
| Accelerator TBBS | 1.6 | 1.6 | 1.6 | 1.6 | 1.6 | 1.6 | 1.6 | 1.6 | 1.6 |
| Sulfur | 1.4 | 1.4 | 1.4 | 1.4 | 1.4 | 1.4 | 1.4 | 1.4 | 1.4 |
| DPG | 0.5 | 0.5 | 0.5 | 0.5 | 0.5 | 0.5 | 2.0 | 2.0 | 2.0 |

[1]SSBR is a solution manufactured styrene butadiene copolymer, in which the styrene content is 23.5 wt. % and the butadiene has 48 wt. % vinyl content.
[2]Vulcan is a registered trademark of Cabot Corporation, Boston, Massachusetts, USA. Vulcan 7H is carbon black meeting ASTM designation N234.
[3]Silica RP 1165 is a silica filler manufactured by Rhone-Poulanc, France.
[4]CRX 2000 is a silicon-treated N234 carbon black having approximately 9.5% ash content prepared in accordance with Example 10, below.

The samples were tested for viscosity using a rotary shear viscometer at 100° C. with a rotor speed of 2 rpm. The percentage of elastomer which was rendered insoluble by the mixing treatment, termed "Bound Rubber," was determined by the following procedure: A wire mesh cage was check weighed to within 0.0001 g. Approximately 0.5 g of compound was sliced into 4 pieces and placed in the cage which was then secured closed. The sample and cage were then weighed to within 0.0001 g. The cage was submerged in about 100 ml of toluene at room temperature. The solvent was replaced with fresh toluene after the first 24 hours. After four days extraction, the sample and cage were removed and allowed to air dry in a fume hood for four hours. The cage and sample were then transferred to a vacuum oven at room temperature for 16 hours or until constant weight was achieved. The cage with sample was weighed to within 0.0001 g. Calculation of bound rubber (BR) is as follows:

$$\%BR = 100\% \times (C - A - f(B-A))/(p(B-A))$$

Where

A = Cage weight

B = Initial cage and sample weight

C = Final cage and sample weight f = Carbon black reaction [% based on formulation]

p = Rubber fraction [% based on formulation]

Test specimens of vulcanized rubber were prepared by compressing the selected sample in a mold at 160° C. for a time equal to that required to attain 90% of the increase in torque as measured in an oscillating die rheometer at 160° C. where the die oscillation was 1.7 Hz through an arc of 1°.

Figure 3:
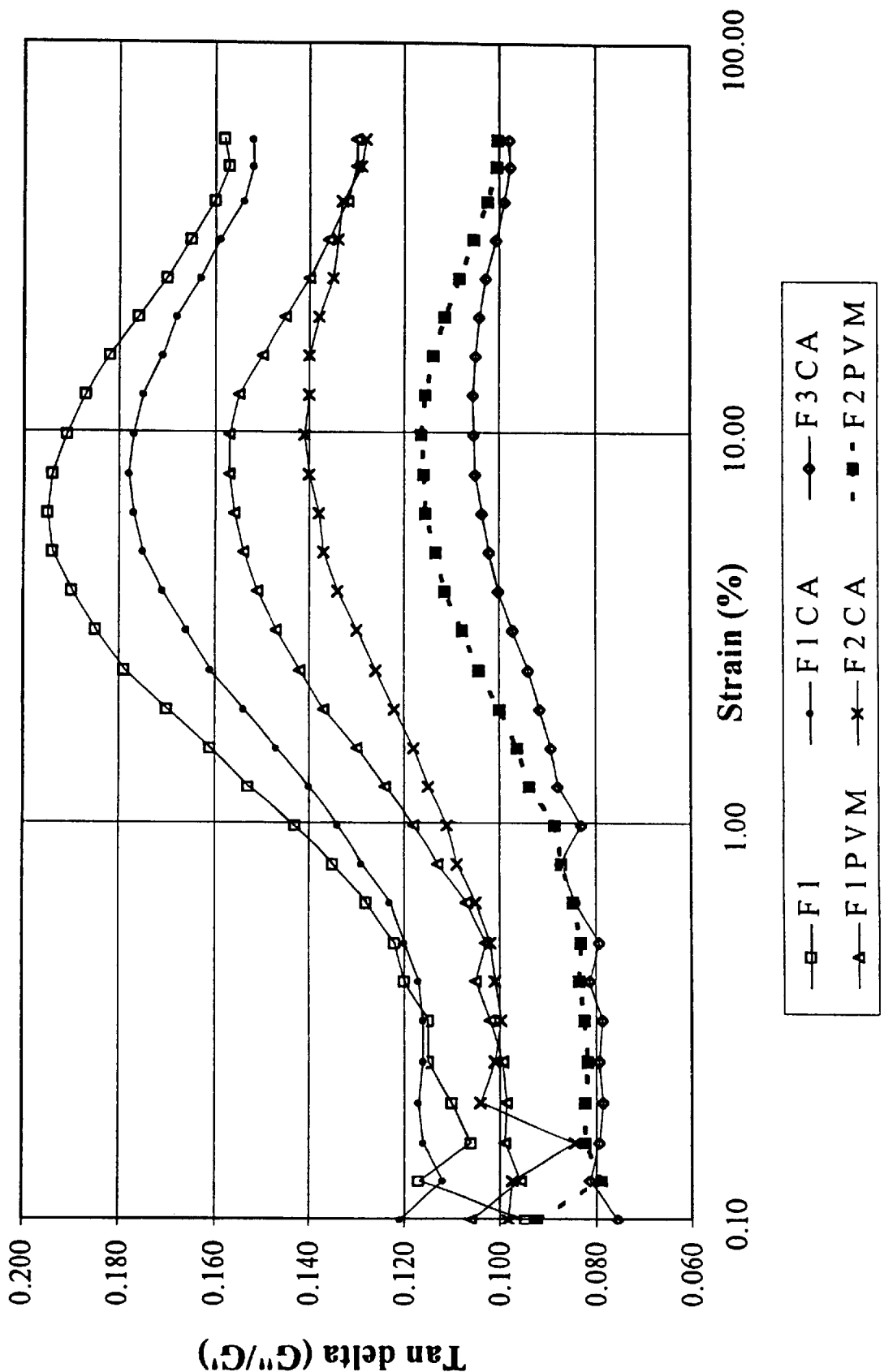
FIG. 3 is a graph showing comparative tan delta figures for elastomer compositions with and without the pre-vulcanization modifiers disclosed here.

Cured rubber testing included stress-strain (tensile properties), hardness, electrical resistivity, and dynamic mechanical properties. The results are shown in Table VIII and the dynamic properties are also represented in graphical form in FIGS. 2 and 3.

TABLE VIII

| Rheology | F1 | F1CA | F1PVM | F2 | F2CA | F2PVM | F3 | F3CA | F3PVM |
|---|---|---|---|---|---|---|---|---|---|
| Mooney Viscosity | 73.3 | 74.7 | 81.9 | 75.3 | 79.2 | 82.9 | 117 | 83.8 | 117 |
| MDR 1 deg arc, 160 degs C., 100 cpm Minimum Torque (dNm) | 10.5 | 10.7 | 11.1 | 10.8 | 10.4 | 10.9 | 20.1 | 10.1 | 14.5 |
| Scorch ts2 (mins) | 1.9 | 1.8 | 1.7 | 2.2 | 1.8 | 2.1 | 1.8 | 1.8 | 0.8 |
| t90 (mins) | 4.6 | 9.9 | 5.4 | 6.1 | 12.0 | 11.8 | 19.3 | 9.1 | 15.4 |
| Maximum Torque (dNm) | 34.5 | 35.3 | 37.8 | 34.7 | 37.0 | 40.1 | 45.9 | 35.8 | 50.1 |
| Delta Torque (dNm) | 24.0 | 24.6 | 26.7 | 23.9 | 26.6 | 29.2 | 25.8 | 25.7 | 35.6 |
| Curative Properties at RT Stress/Strain |  |  |  |  |  |  |  |  |  |
| Tensile Strength (MPa) | 20.8 | 16.6 | 20.5 | 22.7 | 18.6 | 18.8 | 20.3 | 14.9 | 18.5 |
| 100% Modulus | 2.2 | 2.4 | 2.9 | 1.9 | 2.4 | 2.7 | 1.5 | 2.5 | 2.3 |

TABLE VIII-continued

| Rheology | F1 | F1CA | F1PVM | F2 | F2CA | F2PVM | F3 | F3CA | F3PVM |
|---|---|---|---|---|---|---|---|---|---|
| 300% Modulus (MPa) | 12.3 | 13.3 | 16.4 | 10.8 | 14.9 | 16.4 | 4.9 | 13.6 | 9.4 |
| Ultimate Elongation (%) | 435 | 350 | 355 | 495 | 345 | 330 | 755 | 320 | 500 |
| Hardness (A) | 67 | 68 | 70 | 64 | 66 | 68 | 68 | 66 | 71 |
| Bound Rubber (%) | 36.6 | 43.9 | 46.9 | 35.2 | 60.4 | 50.5 | 33.6 | 59.7 | 43.7 |
| % change to control | — | 19.9 | 27.9 | — | 71.6 | 43.6 | — | 77.5 | 30 |
| Elec. Resis at RT (Ohm-cm) | 9E + 5 | 2E + 6 | 4E + 6 | 1E + 8 | 4E + 10 | 5E + 10 | >10E12 | >10E12 | >10E12 |
| Dynamic Mechanical Properties RDS, 10 Hz, Strain Sweep | | | | | | | | | |
| Maximum Tan Delta at 60° C. | 0.195 | 0.178 | 0.157 | 0.169 | 0.141 | 0.116 | 0.187 | 0.105 | 0.123 |
| Normalized | 100 | 91 | 81 | 100 | 83 | 69 | 100 | 56 | 66 |

It can be seen from the data in Table VIII that the effect of the coupling agent TESPT and of the pre-vulcanization modifier APPS was to increase the bound rubber and decrease the tangent delta maximum in all three filler types, although the PVM appears to be more effective in the carbon black and silica modified carbon black than in the silica filler. Since the tangent delta maximum at 60° C. is an indication of undesirable bulk energy loss under rolling conditions, a lower value is preferred. The contribution to the bulk hysterisis from the filler-filler interaction can be readily seen from the strain dependence of the viscoelastic responses. This is shown graphically in FIG. 3 and the advantageously low strain dependence of the invention is clearly evident.

Figure 4:
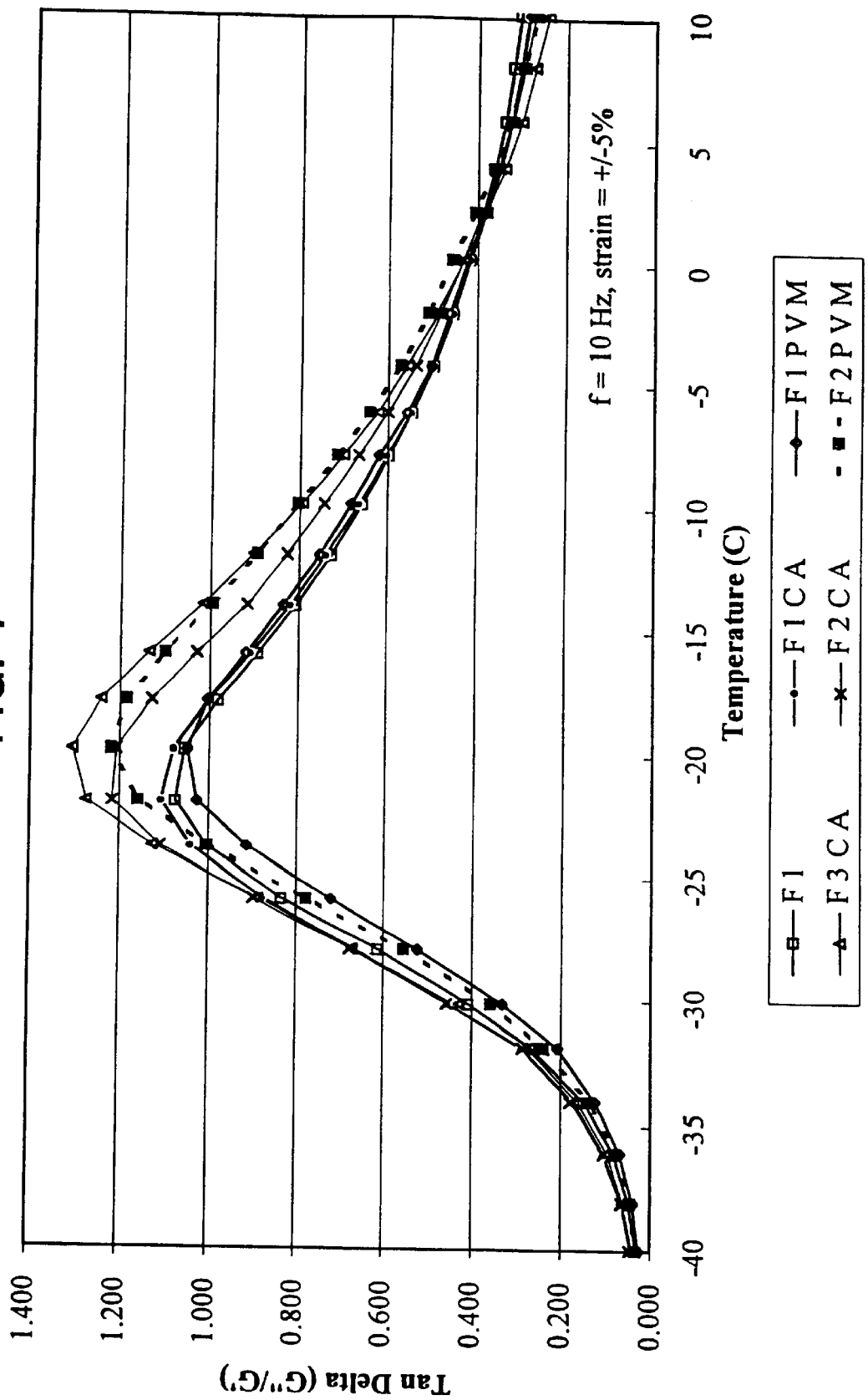
FIG. 4 is a graph showing comparative hysteresis values as a function of temperature for elastomer compositions with and without the pre-vulcanization modifiers disclosed here.

For acceleration, maneuvering and retardation of a vehicle, particularly for wet pavement conditions, it is desirable to increase the energy loss at the interface of the tire tread with the pavement. Under these traction conditions the tire tread interface is subjected to high frequency deformation where the frequency could be as high as 1 Mhz and the interface temperature of the order of 120° C. or higher (R. Bond and G. Morton, Polymer, Vol. 25, Jan. '84, p132–140). Such conditions are not easily duplicated in the laboratory and it is common to utilize the time=temperature superposition principle of Willliiams, Landel and Ferry (M. Williams, R. Landel and J. Ferry, J. Polymer Sci Vol 77, July '55. p3701–3707). It is shown there that frequency and temperatures may be superposed, thus enabling a low frequency/low temperature test to represent higher frequency and temperature conditions. To this end the low er temperature response of the viscoelastic curve is used to estimate the traction potential. The tan delta for the above samples is shown graphically in FIG. 4 wherein it can be seen that neither the coupling agent nor the PVM affect the low temperature tan delta peak in the carbon black sample. However, the for the silica modified carbon black the PVM increases the tan delta values as does the coupling agent. This indicates a higher, more desirable wet traction potential.

Example 10

Silicon-treated carbon blacks according to the present invention were prepared using a pilot scale reactor generally as described above, and as depicted in FIG. 1 and having the dimensions set forth below: $D_1$=4 inches, $D_2$=2 inches, $D_3$=5 inches, $L_1$=4 inches, $L_2$=5 inches, $L_3$=7 inches, $L_4$=1 foot and Q=4.5 feet. The reaction conditions set forth in Table IX below, were employed.

These conditions result in the formation of a carbon black identified by the ASTM designation N234. A commercially available example of N234 is Vulcan® 7H from Cabot Corporation, Boston, Mass. These conditions were altered by adding a volatilizable silicon-containing compound into the reactor, to obtain a silicon-treated carbon black. The flow rate of the volatilizable compound was adjusted to alter the weight percent of silicon in the treated carbon black. The weight percent of silicon in the treated carbon black was determined by the ashing test, conducted according to ASTM procedure D-1506.

Specifically, the silicon-treated carbon black was made by injecting an organo-silicon compound, namely octamethyl-cyclotetrasiloxane (OMTS), into the hydrocarbon feedstock. This compound is sold as "D4" by Dow Corning Corporation, Midland, Mich. The resultant silicon-treated carbon black is identified herein as OMTS-CB.

Since changes in reactor temperature are known to alter the surface area of the carbon black, and reactor temperature is very sensitive to the total flow rate of the feedstock in the injection zone (zone 3 in FIG. 1), the feelstock flow rate was adjusted downward to approximately compensate for the introduction of the volatilizable silicon-containing compound, such that a constant reactor temperature was maintained. This results in approximately constant external surface area (ais measured by t-area) for the resultant carbon blacks. All other conditions were maintained as necessary for manufacturing N234 carbon black. A structure control additive (potassium acetate solution) was injected into the feedstock to maintain the specification structure of the N234 carbon black. The flow rate of this additive was maintained constant in making the silicon-treated carbon black.

The external surface area (t-area) was measured following the sample preparation and measurement procedure described in ASTM D3037—Method A for Nitrogen surface area. For this measurement, the nitrogen adsorption isotherm was extended up to 0.55 relative pressure. The relative pressure is the pressure (P) divided by the saturation pressure ($P_0$) (the pressure at which the nitrogen condenses). The absorption layer thickness ($t_1$) was then calculated using the relation:

$$t_1 = \frac{13.99}{\sqrt{0.024 - \log(P/P_0)}}$$

The volume (V) of nitrogen adsorbed was then plotted against $t_1$. A straight line was then fitted through the data points for $t_1$ values between 3.9 and 6.2 Angstroms. The t-area was then obtained from the slope of this line as follows:

$$t\text{-area }(m^2/gm) = 15.47 \times slope$$

The properties of the silicon-treated carbon black are given in Table X, below.

TABLE IX

| Conditions | |
|---|---|
| Air Rate, kscfh | 12.8 |
| Gas Rate, kscfh | 0.94 |
| feedstock rate, lbs/hr | 155 |
| Si compound rate, lbs/hr | 10.3 |

TABLE X

| Properties | |
|---|---|
| % Silicon in Carbon Black | 4.5 |
| DBP, cc/100 g | 115.0 |
| CDBP, cc/100 g | 103.5 |
| t-Area, m²/g | 121.0 |
| N₂ area, m²/g | 133.0 |

Examples 11–14

In these examples, the pre-vulcanization modifier (PVM) para-tertiarybutyl phenol polysulfide (APPS), was evaluated as an alternative to a commonly used silica coupling agent, bis-(3-triethoxysilylpropyl) tetrasulfane (TESPT) in a solution polymerized styrene-co-butadiene elastomer filled with certain metal-treated carbon black particulate fillers. The elastomer compositions are shown in Table XI, below.

TABLE XI

| | Zinc-1 | Zinc-2 | Alum.-1 | Alum.-2 |
|---|---|---|---|---|
| SSBR[5] | 100 | 100 | 100 | 100 |
| VULCAN 7H[6] | | | | |
| Silica RP 1165[7] | | | | |
| Si-CB | | | | |
| Zn-CB | 50 | 50 | | |
| Al-CB | | | 50 | 50 |
| TESPT | | 2.24 | | 2.24 |
| APPS | | | | |
| Aromatic Oil | 5 | 5 | 5 | 5 |
| Zinc Oxide | 4 | 4 | 4 | 4 |
| Stearic Acid | 2 | 2 | 2 | 2 |

TABLE XI-continued

| | Zinc-1 | Zinc-2 | Alum.-1 | Alum.-2 |
|---|---|---|---|---|
| 6PPD | 1.5 | 1.5 | 1.5 | 1.5 |
| Wax | 1.5 | 1.5 | 1.5 | 1.5 |

[5]SSBR is a solution manufactured styrene butadiene copolymer, in which the styrene content is 23.5 wt. % and the butadiene has 48 wt. % vinyl content.
[6]Vulcan is a registered trademark of Cabot Corporation, Boston, Massachusetts, USA. Vulcan 7H is carbon black meeting ASTM designation N234.
[7]Silica RP 1165 is a silica filler manufactured by Rhone-Poulanc, France.

The compositions were prepared using substantially identical procedures to those detailed in the foregoing description of Examples 1–9.

Four samples were prepared. In the order shown in Table XI below (from left to right), the first two samples each had 50 phr zinc-treated carbon black and the second two samples each had 50 phr aluminum-treated carbon black. These metal-treated carbon blacks were prepared using substantially identical procedures and equipment as detailed above in connection with Example 10. The zinc-treated carbon black was made using zinc-octoate. The aluminum-treated carbon black was made using aluminum butoxide.

The samples were tested in accordance with the procedures detailed above in connection with Examples 1–9 and the test results are presented in Table XII below.

TABLE XII

| Rheology | Zinc-1 | Zinc-2 | Alum.-1 | Alum.-2 |
|---|---|---|---|---|
| Mooney Viscosity | 66.2 | 71.1 | 71.5 | 79.3 |
| MDR 1 deg arc, 160 degs C.,100 cpm Minimum Torque (dNm) | 6.9 | 7.9 | 7.8 | 8.3 |
| Scorch ts2 (mins) | 2.1 | 1.8 | 1.9 | 2 |
| t90 (mins) | 6.41 | 6.33 | 6.02 | 8.36 |
| Maximum Torque (dNm) | 34.5 | 40.9 | 36 | 40.7 |
| Delta Torque (dNm) | 27.6 | 33 | 28.2 | 32.4 |

The reaction conditions used in preparing the zinc-treated carbon black and alumninum-treated carbon black are shown in Tables XIII below. The properties of these materials are shown in Table XIV below.

TABLE XIII

| Conditions | Zinc-Treated Carbon Black | Aluminum Treated Carbon Black |
|---|---|---|
| Air Rate,kscfh | 12.0 | 12.8 |
| Gas Rate, kscfh | 0.953 | 0.954 |
| feedstock rate, lbs/hr | 109 | 110.9 |
| Organo-metal compound rate, lbs/hr | 24.5 | 25.1 |

TABLE XIV

| Conditions | Zinc-Treated Carbon Black | Aluminum Treated Carbon Black |
|---|---|---|
| % Metal in Carbon Black | 6.0 | 4.6 |
| DBP, cc/100 g | 112.8 | 137.8 |
| CDBP, cc/100 g | 90.8 | 104.9 |
| t-Area, m²/g | 116.0 | 130.3 |

In view of the forgoing disclosure, those skilled in the art will recognize that various modifications can be made to the preferred embodiments discussed above without departing from the true scope and spirit of the invention. The following claims are intended to define the present invention in accordance with such true scope and spirit.

We claim:

1. A multi-stage process for producing substantially unvulcanized, processable elastomer composition, comprising:

in a non-productive early stage of the multi-stage process, substantially dispersing modified carbon black particulate filler and sulfuir crosslinking agent into sulfur crosslinkable hydrocarbon elastomer to produce a processable, substantially unvulcanized elastomer masterbatch, the sulfuir crosslinking agent comprising sulfur or sulfur donor effective to crosslink the hydrocarbon elastomer.

2. The multi-stage process for producing substantially unvulcanized elastomer composition in accordance with claim 1 further comprising a productive stage following the early stage, wherein substantially unvulcanized, processable final mix is produced by dispersing into the masterbatch accelerator for the sulfur crosslinking agent.

3. The multi-stage process for producing substantially unvulcanized elastomer composition in accordance with claim 2 wherein essentially no additional crosslinker is added to the masterbatch during the productive stage.

4. The multi-stage process for producing substantially unvulcanized elastomer composition in accordance with claim 1 wherein the substantially unvulcanized elastomer masterbatch produced by the early stage is substantially free of coupling agent.

5. The multi-stage process for producing unvulcinized, processable elastomer composition in accordance with claim 1 wherein the modified carbon black particulate filler comprises at least one treated carbon black.

6. The multi-stage process for producing substantially unvulcanized, processable elastomer composition in accordance with claim 1 fiurther comprising adding and substantially dispersing oil during thermomechanical working of the masterbatch after substantially dispersing the sulfur crosslinking agent and filler.

7. The multi-stage process for producing substantially unvulcanized, processable elastomer composition in accordance with claim 6 further comprising the step of mixing the filler and the sulfur crosslinking agent together in a pre-blend prior to being added to the elastomer.

8. The multi-stage process for producing substantially unvulcanized, processable elastomer composition in accordance with claim 2 wherein no sulfur crosslinking agent is added to the masterbatch subsequent to the early stage.

9. The multi-stage process for producing substantially unvulcanized, processable elastomer composition in accordance with claim 5 wherein the treated carbon black comprises silicon-treated carbon black.

10. The multi-stage process for producing substantially unvulcanized, processable elastomer composition in accordance with claim 5 wherein the treated carbon black is selected from silicon-treated carbon black, aluminum-treated carbon black, zinc-treated carbon black and a mixture of any of them.

11. A multi-stage process for producing substantially unvulcanized elastomer composition, comprising:

forming a pre-blend of particulate fillers comprising carbon black, silica or modified carbon black, and sulfur crosslinking agent selected from sulfur donors and sulfur;

in a first stage of the multi-stage process, adding and substantially dispersing the pre-blend into sulfur crosslinkable hydrocarbon elastomer by thermomechanical working, and then adding and substantially dispersing aromatic oil into the elastomer by subsequent thermomechanical working; and then thermomechanically working the masterbatch produced in the first stage in at least one additional stage during which a curative additive comprising accelerator for the sulfur crosslinking agent is added and substantially dispersed into the masterbatch to form the elastomer composition.

12. The multi-stage process for producing substantially unvulcanized elastomer composition in accordance with claim 11 wherein the accelerator comprises N-cyclohexane-2-benzothiazole sulphenamide, 2-mercaptobenzothiazole, tetramethyl thiuram disulfide, diphenyl guanidine or a mixture of any of them.

13. A substantially unvulcanized elastomer composition produced by a multi-stage process in accordance with claim 11.

14. A masterbatch comprising sulfur crosslinkable hydrocarbon elastomer, particulate filler, sulfur crosslinking agent and oil, the particulate filler, sulfur crosslinking agent and oil all being substantially homogeneously distributed throughout the elastomer and the masterbatch comprising substantially no coupling agent and no accelerator for the sulfur crosslinking agent.

15. A vulcanizate produced by vulcanizing a substantially unvulcanized elastomer composition produced by a multi-stage process in accordance with claim 11.

16. Tire tread formed of vulcanizate of claim 15.

17. A substantially unvulcanized, processable elastomer composition comprising:

unsaturated elastomer, treated carbon black particulate filler, and a pre-vulcanization modifier reactive as a crosslinking agent with the elastomer and present in an amount effective to substantially increase bound rubber content in a substantially unvulcanized, processable elastomer product of a non-productive thermomechanical working of the elastomer composition.

18. The substantially unvulcanized, processable elastomer composition of claim 17 wherein the elastomer composition is substantially free of accelerator for the pre-vulcanization modifier.

19. The substantially unvulcanized, processable elastomer composition of claim 17 having a Mooney viscosity less than 150 mu at 100° C. (ML) measured in accordance with ASTM 1646.

20. The substantially unvulcanized, processable elastomer composition of claim 17 wherein the pre-vulcanization modifier is a non-silane polysulfidic organo-compound.

21. The substantially unvulcanized, processable elastomer composition of claim 20 wherein the pre-vulcanization modifier is a non-silane polysulfidic alkylphenol in which each of the alkyl groups is tertiary.

22. The substantially unvulcanized, processable elastomer composition of claim 20 wherein the pre-vulcanization modifier is selected from tertiary butylphenol polysulfide, dithiodimorpholine, dicaprolactam disulfide and mixtures of any of them.

23. The substantially unvulcanized, processable elastomer composition of claim 20 wherein the pre-vulcanization modifier is tertiary butylphenol polysulfide.

24. The substantially unvulcanized, processable elastomer composition of claim 17 wherein the pre-vulcanization modifier is present in an arrount between 0.5 and 10 phr.

25. The substantially unvulcanized, processable elastomer composition of claim 17 wherein the treated carbon black is silicon-treated carbon black.

26. The substantially unvulcanized, processable elastomer composition of claim 25 wherein the silicon-treated carbon black is oxidized.

27. The substantially unvulcanized, processable elastomer composition of claim 25 wherein the silicon-treated carbon black contains between 0.1 wt. % and 25 wt. % silicon.

28. The substantially unvulcanized, processable elastomer composition of claim 25 wherein the silicon-treated carbon black contains between 2 wt. % and 6 wt. % silicon.

29. The substantially unvulcanized, processable elastomer composition of claim 25 further comprising sulfur in an amount less than 10 phr.

30. The substantially unvulcanized, processable elastomer composition of claim 17 wherein the unsaturated elastomer comprises the natural rubber, a chlorinated derivative of natural rubber, or a homopolymer, copolymer or terpolymer of butadiene, styrene, isoprene, isobutylene, 3,3-dialkyl-1, 3-butadiene where the alkyl group is C1 to C3 alkyl, acrylonitrile, ethylene or propylene.

31. The substantially unvulcanized, processable elastomer composition of claim 30 wherein the unsaturated elastomer is solution SBR wherein between 12% to 90% of the butadiene mers are incorporated at the 1, 2-position.

32. The substantially unvulcanized, processable elastomer composition of claim 17 further comprising a silane coupling agent.

33. The substantially unvulcanized, processable elastomer composition of claim 32 wherein the silane coupling agent is vinyl-terminated silane methacrylate terminated silane or a mixture of any of them.

34. The substantially unvulcanized, processable elastomer composition of claim 33 wherein the coupling agent is selected from the group consisting of bis(3-triethoxysilylpropyl)tetrasulfane, 3-thiocyanatopropyl-triethoxy silane, vinyltriethoxysilane, methacryloxypropyltrimethoxysilane, vinyl-tris-(2-methoxysilane) and mixtures of any of them, in an amount of 0.1to 15 parts per hundred of elastomer.

35. A sulfur-vulcanizable substantially unvulcanized, processable elastomer composition comprising:
  sulfur-vulcanizable elastomer comprising solution SBR, natural rubber, functional solution SBR, emulsion SBR, polybutadiene, polyisoprene or a mixture of any of them;
  colloidal filler material containing between 0.1 wt. % and 25 wt. % silicon, comprising silicon-treated carbon black having silicon-containing regions primarily at the surface of carbon black aggregates, silicon-treated carbon black having silicon-containing regions distributed throughout carbon black aggregates or a mixture of any of them;
  pre-vulcanization modifier in an amount of 2–6 phr, comprising tertiary butylphenol polysulfide, dithiodimorpholine, dicaprolactarn disulfide or a mixture of any of them, effective to substantially increase bound rubber content in a unvulcanized masterbatch composition produced by a non-productive thermomechanical working of the masterbatch reaching a maximum temperature between 130° and 180° C. for a suitable period of time between 10 seconds and 20 minutes in duration; and treating agent in an amount of 1 to 4 phr bis(3-triethoxysilylpropyl)tetrasulfane, 3-thiocyanatopropyl-triethoxy silane, vinyltriethoxysilane, methacryloxypropyltrimethoxysilane, vinyl-tris-(2-methoxysilane) or a mixture of any of them.

36. An elastomer composition comprising treated carbon black particulate filler dispersed in SBR elastomer with the reaction product of pre-vulcanization modifier selected from non-silane polysulfidic organo-compounds.

37. A sulfur-vulcanizable elastomer composition comprising colloidal filler material containing between 0.1 wt. % and 25 wt. % silicon, selected from silicon-treated carbon black having silicon-containing regions primarily at the surface of carbon black aggregates, silicon-treated carbon black having silicon-containing regions distributed throughout carbon black aggregates or any mixture thereof, dispersed in sulfur-vulcanizable elastomer selected from solution SBR, natural rubber, functional solution SBR, emulsion SBR, polybutadiene, polyisoprene or a mixture of any of them, with the reaction products (i) of a pre-vulcanization modifier selected from tertiary butylphenol polysulfide, dithiodimorpholine, dicaprolactam disulfide or i mixture of any of them, and (ii) of a second treating agent selected from bis(3-triethoxysilylpropyl)tetrasulfane, 3-thiocyanatopropyl-triethoxy silane, vinyltriethoxysilane, methacryloxypropyltrimethoxysilane, vinyl-tris-(2-methonysilane) or a mixture of any of them.

38. A sulfur-vulcanizable elastomer composition formed by a process comprising the steps of:
  (A) preparing a substantially unvulcanized, processable masterbatch comprising unsaturated elastomer, treated carbon black particulate filler and a pre-vulcanization modifier selected from non-silane polysulfidic organo-compounds effective to substantially increase bound rubber content in a unvulcanized masterbatch composition resulting from step (B); and
  (B) substantially increasing bound rubber content by thermomechanically working the masterbatch of step (A) in the absence of a vulcanization system, including at least one thermal working stage reaching a maximum temperature which would be sufficient to vulcanize the base composition in the presence of a vulcanization system.

39. A sulfur-vulcanizable elastomer composition formed by a process comprising the steps of:
  (A) preparing a masterbatch comprising colloidal filler material containing between 0.1 wt. % and 25 wt. % silicon, selected from silicon-treated carbon black having silicon-containing regions primarily at the surface of carbon black aggregates, silicon-treated carbon black having silicon-containing regions distributed throughout carbon black aggregates and any mixture thereof, dispersed in sulfur-vulcanizable elastomer selected from solution SBR, natural rubber, functional solution SBR, emulsion SBR, polybutadiene, polyisoprene and mixtures of any of them, with the reaction products (i) of a pre-vulcanization modifier selected from tertiary butylphenol polysulfide, dithiodimorpholine, dicaprolactam disulfide and mixtures of any of them, and (ii) of a second treating agent selected from bis(3-triethoxysilylpropyl)tetrasulfane, 3-thiocyanatopropyl-triethoxy silane, vinyltriethoxysilane, methacryloxypropyltrimethoxysilane, vinyl-tris-(2-methoxysilane) and mixtures of any of them; and
  (B) thermomechanically working the masterbatch of step (A) in the absence of a vulcanization system, including at least one thermal working stage reaching a maximum temperature between 130° and 180° C. for a suitable period of time between 10 seconds and 20 minutes in duration.

40. A vulcanizable elastomer composition formed by a process comprising the steps of:
(A) preparing a masterbatch comprising unsaturated elastomer, silicon-treated carbon black particulate filler and a pre-vulcanization modifier selected from non-silane polysulfidic organo-compounds effective to substantially increase bound rubber content in the masterbatch in step (B); and
(B) thermomechanically working the masterbatch of step (A) in the absence of a vulcanization system, including at least one thermal working stage reaching a maximum temperature which would be sufficient to vulcanize the base composition in the presence of a vulcanization system; and
(C) performing a finishing step comprising adding to the masterbatch a vulcanization system effective to vulcanize the masterbatch at a vulcanization temperature, and thermomechanically working the rubber masterbatch and vulcanization system at a temperature below the vulcanization temperature.

41. A vulcanized elastomer composition formed by vulcanizing an elastomer composition of claim 17.

42. A tire tread formed of vulcanized elastomer composition in accordance with claim 41.

43. A process for making an elastomer composition comprising the steps of:
(A) preparing a masterbatch comprising unsaturated elastomer, treated carbon black particulate filler and a pre-vulcanization modifer selected from non-silane polysulfidic organo-compounds effective to substantially increase bound rubber content in step (B); and
(B) thermomechanically working the masterbatch cf step (A) in the absence of a vulcanization system to substantially increase its bound rubber content, including at least one thermal working stage reaching a maximum temperature which would be sufficient to vulcanize the base composition in the presence of a vulcanization system.

* * * * *

UNITED STATES PATENT AND TRADEMARK OFFICE
CERTIFICATE OF CORRECTION

PATENT NO.    : 6,291,572 B1
DATED         : September 18, 2001
INVENTOR(S)   : Brown et al.

It is certified that error appears in the above-identified patent and that said Letters Patent is hereby corrected as shown below:

Column 1,
Line 34, replace "deformationi" with -- deformation --.

Column 2,
Line 21, replace "e xacerbating" with -- exacerbating --.

Column 3,
Line 32, replace "elastorner" with -- elastomer --.

Column 4,
Line 8, replace "vulcanizatiorn" with -- vulcanization --.
Line 14, replace "sulfuir" with -- sulfur --.

Column 6,
Line 36, replace "Proces" with -- Process --.
Line 67, replace "colorimetry" with -- calorimetry --.

Column 7,
Line 13, replace "70 paris" with -- 70 parts --.
Line 42, replace "co.mposition" with -- composition --.

Column 9,
Line 23, replace "thernomechanical" with -- thermomechanical --.
Line 41, replace "w:ith" with -- with --.
Line 50, replace "Alteniatively" with -- Alternatively --.

Column 10,
Line 17, replace "ofthe" with -- of the --.
Line 47, replace "determriine" with -- determine --.
Line 55, replace "volatalizable" with -- volatilizible --.

Column 11,
Line 10, replace "silicon-tr(eated)" with -- silicon-treated --.
Line 38, replace "fuiels" with -- fuels --.
Line 53, replace "sin,ole" with -- single --.
Line 57, replace "atnd" with -- and --.

UNITED STATES PATENT AND TRADEMARK OFFICE
CERTIFICATE OF CORRECTION

PATENT NO.    : 6,291,572 B1                                  Page 2 of 4
DATED         : September 18, 2001
INVENTOR(S)   : Brown et al.

It is certified that error appears in the above-identified patent and that said Letters Patent is hereby corrected as shown below:

Column 12,
Line 34, replace "rea(tion" with -- reaction --.
Line 43, replace "volatalizable" with -- volatilizable --.
Line 67, replace "Usefuil" with -- Useful --.

Column 13,
Line 29, replace "This is," with -- That is, --.
Line 32, replace "diazoniuri salt" with -- diazonium salt --.
Line 33, replace "inventicn" with -- invention --.
Line 41, replace "siiti" with -- situ --.
Line 52, replace "c,ccurs" with -- occurs --.

Column 14,
Line 5, replace "sitll" with -- situ --.
Line 17, replace "sallt" with -- salt --.
Line 27, replace "anine" with -- amine --.
Line 34, replace "itn" with -- in --.
Line 59, replace "examnple" with -- example --.

Column 15,
Line 27, replace "blaick" with -- black --.

Column 16,
Line 66, replace "frcm" with -- from --.

Column 17,
Line 12, replace "pyridinyul" with -- pyridinyl --.
Line 13, replace "stearic" with -- steric --.
Line 19, replace "Prefi rred" with -- Preferred --.
Line 41, replace "N-methyl-pyiridyl" with -- N-methyl-pyridyl --.

Column 18,
Line 56, replace "rmay" with -- may --.

Column 19,
Line 7, replace "silicon-trealed" with -- silicon-treated --.
Line 49, replace "depeLrd" with -- depend --.
Line 61, replace "olfthe" with -- of the --.

UNITED STATES PATENT AND TRADEMARK OFFICE
CERTIFICATE OF CORRECTION

PATENT NO. : 6,291,572 B1
DATED : September 18, 2001
INVENTOR(S) : Brown et al.

It is certified that error appears in the above-identified patent and that said Letters Patent is hereby corrected as shown below:

Column 20,
Line 41, replace "sulfuir" with -- sulfur --.
Line 47, replace "anad" with -- and --.

Column 22,
Line 23, replace "ofthe" with -- of the --.
Line 26, replace "sulfui" with -- sulfur --.
Line 28, replace "mix:ing" with -- mixing --.
Line 45, replace "sulfair" with -- sulfur --.

Column 35,
Line 25, replace "sulfuir" with -- sulfur --.

Column 37,
Line 6, replace "shcwn" with -- shown --.

Column 38,
Line 25, replace "effect:ive" with -- effective --.
Lines 63-64, replace "elaistomer" with -- elastomer --.

Column 39,
Line 27, replace "frorri" with -- from --.

Column 40,
Line 30, replace "colorimetry" with -- calorimetry --.
Line 52, replace "clonors" with -- donors --.
Lines 62-63, replace "elastomner" with -- elastomer --.
Line 64, replace "pow,er" with -- power --.

Column 41,
Line 25, replace "hystericis" with -- hysterisis --.

Column 45,
Line 49, replace "Williiams" with -- Williams --.

UNITED STATES PATENT AND TRADEMARK OFFICE
CERTIFICATE OF CORRECTION

PATENT NO.    : 6,291,572 B1
DATED         : September 18, 2001
INVENTOR(S)   : Brown et al.

It is certified that error appears in the above-identified patent and that said Letters Patent is hereby corrected as shown below:

Column 46,
Line 49, replace "feelstock" with -- feedstock --.
Line 54, replace "ais" with -- as --.

Column 49,
Lines 22 and 25, replace "sulfuir" with -- sulfur --.
Line 42, replace "unvulcinized" with -- unvulcanized --.
Line 48, replace "fiurther" with -- further --.

Column 51,
Line 6, replace "arrount" with -- amount --.
Lines 24-35, replace "3,3-dialkyl-1,3-butadiene" with -- 2,3-dimethyl-1,3-butadiene --.

Column 54,
Line 11, replace "modifer" with -- modifier --.
Line 14, replace "cf" with -- of --.

Signed and Sealed this

Tenth Day of June, 2003

JAMES E. ROGAN
*Director of the United States Patent and Trademark Office*